United States Patent
Park et al.

(10) Patent No.: US 11,665,704 B2
(45) Date of Patent: May 30, 2023

(54) METHOD AND APPARATUS FOR CONTROL AND DATA CHANNEL TRANSMISSION AND RECEPTION IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Seunghoon Choi, Suwon-si (KR); Hyunseok Ryu, Suwon-si (KR); Jonghyun Bang, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/162,523

(22) Filed: Jan. 29, 2021

(65) Prior Publication Data
US 2021/0266941 A1 Aug. 26, 2021

(30) Foreign Application Priority Data
Feb. 19, 2020 (KR) .......................... 10-2020-0020164

(51) Int. Cl.
*H04W 72/23* (2023.01)
*H04W 72/1268* (2023.01)
(Continued)

(52) U.S. Cl.
CPC ........... *H04W 72/23* (2023.01); *H04L 1/1819* (2013.01); *H04L 5/0053* (2013.01);
(Continued)

(58) Field of Classification Search
CPC ......... H04W 72/1268; H04W 72/0446; H04W 72/1289; H04L 27/2607; H04L 5/0053; H04L 1/1819
(Continued)

(56) References Cited

U.S. PATENT DOCUMENTS

| | | | |
|---|---|---|---|
| 2018/0220414 A1* | 8/2018 | Yin | ................. H04L 5/0053 |
| 2020/0053766 A1* | 2/2020 | Chien | ................. H04L 1/1854 |

(Continued)

OTHER PUBLICATIONS

3rd Generation Partnership Project; Technical Specification Group Radio Access Network; NR; Physical layer procedures for data (Release 15), 3GPP TS 38.214 V15.7.0, Sep. 2019.
(Continued)

*Primary Examiner* — Peter G Solinsky
(74) *Attorney, Agent, or Firm* — Jefferson IP Law, LLP

(57) ABSTRACT

The disclosure relates to a communication technique for convergence between an IoT technology and a 5G system for supporting higher data transmission rate beyond a 4G system, and a system thereof. The disclosure may be applied to intelligence services (e.g., smart homes, smart buildings, smart cities, smart cars or connected cars, healthcare, digital education, retail businesses, security and safety related services, etc.), based on a 5G communication system and an IoT related technology. The disclosure provides a method and apparatus for transmitting uplink control information by a terminal.

16 Claims, 14 Drawing Sheets

(51) Int. Cl.
  *H04L 27/26* (2006.01)
  *H04L 1/1812* (2023.01)
  *H04L 5/00* (2006.01)
  *H04W 72/0446* (2023.01)

(52) U.S. Cl.
  CPC ..... *H04L 27/2607* (2013.01); *H04W 72/0446* (2013.01); *H04W 72/1268* (2013.01)

(58) Field of Classification Search
  USPC .......................................................... 370/329
  See application file for complete search history.

(56) References Cited

U.S. PATENT DOCUMENTS

| | | | | |
|---|---|---|---|---|
| 2020/0221448 | A1* | 7/2020 | Park | H04W 72/042 |
| 2020/0229211 | A1* | 7/2020 | Hosseini | H04W 28/0205 |
| 2020/0267597 | A1* | 8/2020 | Huang | H04L 1/1854 |
| 2020/0328849 | A1* | 10/2020 | Noh | H04W 72/042 |
| 2020/0351026 | A1* | 11/2020 | Babaei | H04L 1/1835 |
| 2021/0050955 | A1* | 2/2021 | Park | H04L 1/1614 |
| 2021/0135946 | A1* | 5/2021 | Babaei | H04L 1/1812 |
| 2021/0391955 | A1* | 12/2021 | He | H04L 1/1861 |
| 2022/0116952 | A1* | 4/2022 | Lee | H04W 72/1242 |
| 2022/0159692 | A1* | 5/2022 | Lee | H04L 1/1864 |
| 2022/0264563 | A1* | 8/2022 | Choi | H04W 72/0413 |

OTHER PUBLICATIONS

3rd Generation Partnership Project; Technical Specification Group Radio Access Network; NR; Physical layer procedures for control (Release 15), 3GPP TS 38.213 V15.7.0, Sep. 2019.

Nokia et al., Clarification to the dynamically scheduled PDSCH collision with SPS-PDSCH, 3GPP TSG RAN WG1 #98bis, R1-1911663, Oct. 14-20, 2019, Chongqing, P.R. China.

3rd Generation Partnership Project; Technical Specification Group Radio Access Network; NR; Multiplexing and channel coding (Release 15), 3GPP TS 38.212 V15.7.0, Sep. 2019.

* cited by examiner

METHOD AND APPARATUS FOR CONTROL AND DATA CHANNEL TRANSMISSION AND RECEPTION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0020164, filed on Feb. 19, 2020, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for control and data channel transmission and reception.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Since various services can be provided with the advance of wireless communication systems as described above, schemes for efficiently providing these services are needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method and apparatus for efficiently transmitting control information by a terminal.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, configuration information on a physical uplink control channel (PUCCH), the configuration information including a sub-slot configuration for the PUCCH, receiving, from the base station, downlink control information (DCI) for scheduling downlink data, the DCI including a feedback timing indicator and a PUCCH resource indicator (PRI), receiving, from the base station, the downlink data on a physical downlink shared channel (PDSCH) based on the DCI, identifying a sub-slot for the PUCCH and a PUCCH resource based on the sub-slot configuration for the PUCCH, the feedback timing indicator, and the PRI, and transmitting, to the base station, HARQ-ACK information for the downlink data on the identified PUCCH resource in the sub-slot for the PUCCH, wherein the sub-slot configuration for the PUCCH includes information on a length of a sub-slot for the PUCCH In accordance with another aspect of the disclosure, a method performed by a base station in a communication system is provided. The method includes transmitting, to a terminal, configuration information on a physical uplink control channel (PUCCH), the configuration information including a sub-slot configuration for the PUCCH, transmitting, to the terminal, downlink control information (DCI) for scheduling downlink data, the DCI including a feedback timing indicator and a PUCCH resource indicator (PRI), transmitting, to the terminal, the downlink data on a physical downlink shared channel (PDSCH), and receiving, from the terminal, HARQ-ACK information corresponding to the downlink data on a PUCCH resource in a sub-slot for the PUCCH, wherein the sub-slot for the PUCCH and the PUCCH resource depend on the sub-slot configuration for the PUCCH, the feedback timing indicator, and the PRI, and wherein the sub-slot configuration for the PUCCH includes information on a length of a sub-slot for the PUCCH.

In accordance with another aspect of the disclosure, a terminal in a communication system is provided. The terminal includes a transceiver, and a controller coupled with the transceiver and configured to receive, from a base station, configuration information on a physical uplink control channel (PUCCH), the configuration information including a sub-slot configuration for the PUCCH, receive, from the base station, downlink control information (DCI) for scheduling downlink data, the DCI including a feedback timing indicator and a PUCCH resource indicator (PRI), receive, from the base station, the downlink data on a physical downlink shared channel (PDSCH) based on the DCI, identify a sub-slot for the PUCCH and a PUCCH resource based on the sub-slot configuration for the PUCCH, the feedback timing indicator, and the PRI, and transmit, to the base station, HARQ-ACK information for the downlink data on the identified PUCCH resource in the sub-slot for the PUCCH, wherein the sub-slot configuration for the PUCCH includes information on a length of a sub-slot for the PUCCH.

In accordance with another aspect of the disclosure, a base station in a communication system is provided. The base station includes a transceiver, and a controller coupled with the transceiver and configured to transmit, to a terminal, configuration information on a physical uplink control channel (PUCCH), the configuration information including a sub-slot configuration for the PUCCH, transmit, to the terminal, downlink control information (DCI) for scheduling downlink data, the DCI including a feedback timing indicator and a PUCCH resource indicator (PRI), transmit, to the terminal, the downlink data on a physical downlink shared channel (PDSCH), and receive, from the terminal, HARQ-ACK information corresponding to the downlink data on a PUCCH resource in a sub-slot for the PUCCH, wherein the sub-slot for the PUCCH and the PUCCH resource depend on the sub-slot configuration for the PUCCH, the feedback timing indicator, and the PRI, and wherein the sub-slot configuration for the PUCCH includes information on a length of a sub-slot for the PUCCH.

In accordance with another aspect of the disclosure, services can be effectively provided in a wireless communication system. Specifically, when sub-slot-based or slot-based communication is performed, a terminal can effectively transmit control information, whereby data can be effectively transmitted or received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
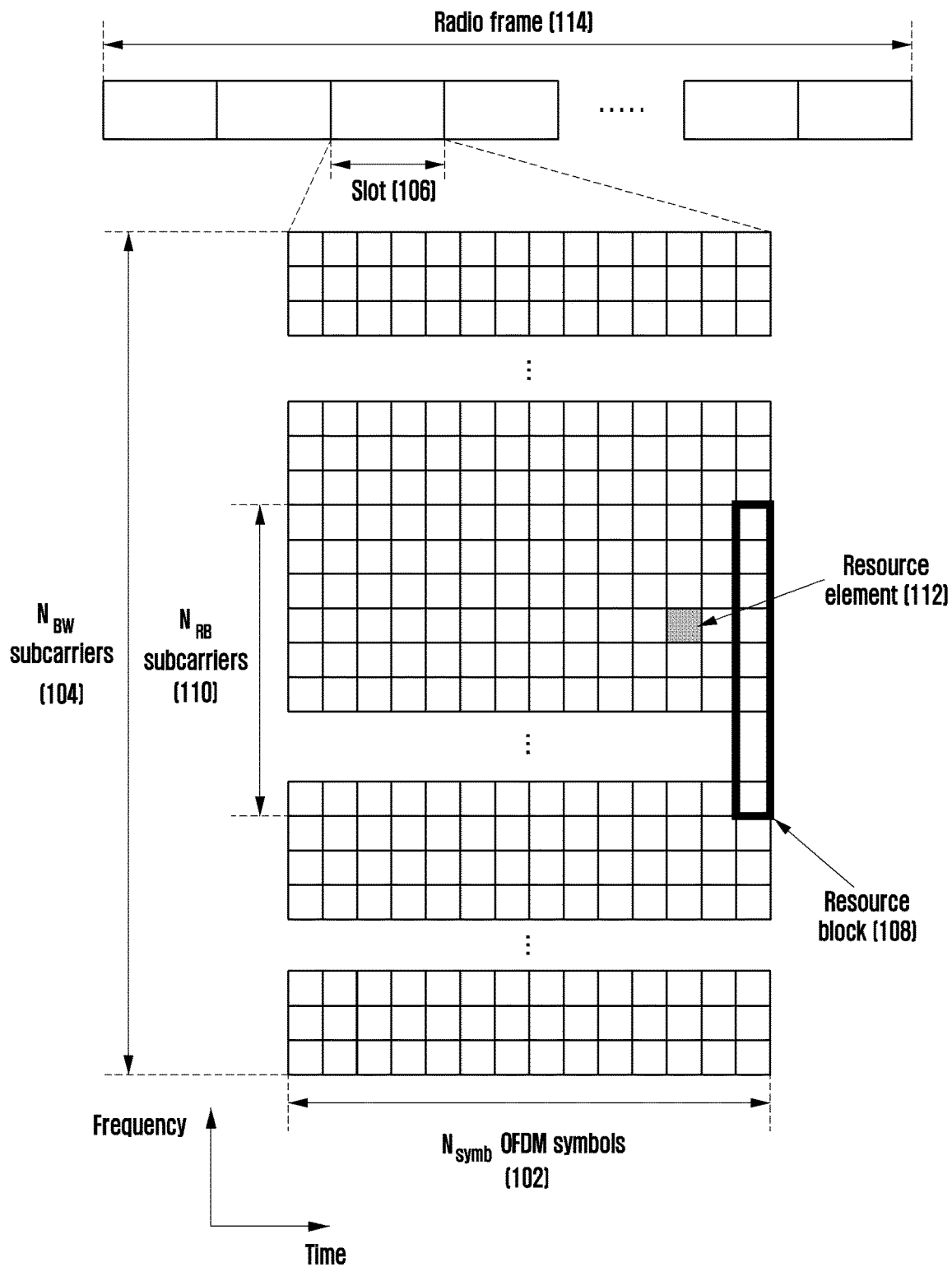
FIG. 1 illustrates a structure of transmission through a time-frequency area that is a wireless resource area in a 5G or NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by non-transitory, computer program instructions. These computer program instructions can be provided to a processor of a general-purpose computer, special-purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE. Furthermore, communication standards of 5G or new radio (NR) are being developed as 5th generation wireless communication systems.

As a representative example of the broadband wireless communication systems, in a 5G or NR system, an orthogonal frequency-division multiplexing (OFDM) scheme has been adopted for a downlink (DL) and an uplink (UL). More specifically, a cyclic-prefix OFDM (CP-OFDM) scheme has been adopted for the downlink, and a CP-OFDM scheme and a discrete Fourier transform spreading (DFT-S-OFDM) scheme have been adopted for the uplink. The uplink indicates a radio link through which data or a control signal is transmitted from a terminal (a user equipment (UE) or a mobile station (MS)) to a base station (a gNode B, an eNode B, or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

The 5G or NR system adopts a hybrid automatic repeat request (HARQ) scheme of retransmitting corresponding data in a physical layer when a decoding failure occurs in initial transmission. According to the HARQ scheme, when a receiver fails to precisely decode data, the receiver transmits information (negative acknowledgement (NACK)) notifying a transmitter of the decode failure, to the transmitter so that the transmitter can retransmit the corresponding data in the physical layer. The receiver combines the data retransmitted by the transmitter with the data for which decoding has previously failed, thereby increasing data reception performance. Furthermore, when the receiver accurately decodes data, the receiver transmits information (acknowledgement (ACK)) notifying the transmitter of a decoding success, to the transmitter so that the transmitter can transmit new data.

A new radio access technology (NR) system which is a new 5G communication system is designed to freely multiplex various services in time and frequency resources. Accordingly, waveform/numerology, a reference signal and the like may be dynamically or freely allocated according to a need for the corresponding services. In order to provide an optimal service to a terminal in wireless communication, it is important to transmit optimized data, based on a quality of channels and a measurement of an interference amount. Accordingly, it is essential to accurately measure a channel state. However, unlike the 4G communication in which channel and interference characteristics are not greatly changed depending on frequency resources, the 5G or NR channel has channel and interference characteristics greatly changed depending on services, and accordingly, there is a need to support a subset of frequency resource group (FRG) that can measure the channel and interference characteristics separately. In the 5G or NR system, types of supported services may be classified into categories such as enhanced mobile broadband (eMBB), massive machine type communications (mMTC), ultra-reliable and low-latency communications (URLLC), or the like. The eMBB is a service aiming at a high-speed transmission of high-capacity data, the mMTC is a service aiming at terminal power minimization and an access of multiple terminals, and the URLLC is a service aiming at high reliability and low latency. Different requirements may be applied depending on a type of services applied to the terminal.

Among the above services, since the URLLC service aims at high reliability and low latency, there may be a need to transmit control information and data information, which are transmittable on a physical channel, at a low coding rate. In the case of the control information, a control information repetitive transmission function is already introduced to an MTC or narrow band Internet-of-Things (NB-IoT) service of LTE. The control information repetitive transmission function is introduced to provide high coverage for terminals having a small bandwidth, but a delay time is not sufficiently considered. Also, a minimum unit of control information repetitive transmission is fixed to a subframe unit based on LTE. In order for the NR or 5G system to support the URLLC, a control information repetitive transmission mode needs to be introduced to increase reliability while requesting a low latency time. Accordingly, in the disclosure, a case in which control information is repeatedly transmitted in a slot is generally considered. In addition, a case in which control information is repeatedly transmitted over a slot boundary is also considered. Through an operation provided in the disclosure, a terminal may detect control information transmitted from a base station, promptly and with high reliability.

Terms used below are defined in consideration of functions in the disclosure, and may have different meanings according to an intention of a user or operator, customs, or the like. Thus, the terms should be defined based on the description throughout the specification. Hereinafter, a base station is an entity that performs resource allocation to a terminal, and may be at least one of a gNode B (gNB), an eNode B (eNB), a Node B, a base station (BS), a radio access unit, a base station controller, or a node on a network. A terminal may include a user equipment (UE), a mobile station (MS), a cellular phone, a smartphone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from a terminal to a base station. Furthermore, hereinafter, the NR system is described as an example in the disclosure, but is not limited thereto, and embodiments of the disclosure may be applied to other communication systems having a similar technical background or channel type. Furthermore, an embodiment of the disclosure may be applied to other communication systems through some modification without greatly departing from the range of the disclosure based on a determination of those having skilled technical knowledge.

In the disclosure, terms "physical channel" and "signal" in a conventional sense may be interchangeably used with "data" or a "control signal." For example, a physical downlink shared channel (PDSCH) is a physical channel through which data is transmitted, but in the disclosure, the PDSCH may be used to refer to data. Furthermore, "transmission of uplink control information (UCI) on a PUCCH or a PUSCH" may be interchangeably used with "PUCCH transmission" or "PUSCH transmission."

In the disclosure, higher signaling (interchangeably used with "higher-layer signaling," "higher-layer configuration," "a higher signal," or the like) is a scheme of transferring a signal from a base station to a terminal by using a downlink data channel in a physical layer, or transferring a signal from a terminal to a base station by using an uplink data channel in a physical layer, and may be referred to as radio resource control (RRC) signaling (this may include a master information block (MIB) and a system information block (SIB)) or a medium access control-control element (MAC-CE). A layer 1 (L1) signal is control information transmitted in a physical layer, and may include DCI or UCI.

Along with the recent on-going research into next-generation communication systems, various schemes for scheduling communication with the terminal have been discussed. Accordingly, there is a need for an efficient scheduling and data transmission or reception scheme that considers characteristics of the next-generation communication systems.

FIG. 1 illustrates a structure of transmission through a time-frequency area that is a wireless resource area in a 5G or NR system according to an embodiment of the disclosure.

Referring to FIG. 1, in the wireless resource area, a horizontal axis represents a time domain and a vertical axis represents a frequency domain. A minimum transmission unit in the time domain is an OFDM symbol, and $N_{symb}$ OFDM symbols 102 constitute one slot 106. The length of a subframe may be defined as 1.0 ms, and the length of a radio frame 114 may be defined as 10 ms. A minimum transmission unit in the frequency domain is a subcarrier, and the bandwidth of the entire system transmission bandwidth includes a total of $N_{BW}$ subcarriers 104. However, such specific numerical values may vary depending on a system.

In the time-frequency area, a basic unit is a resource element (RE) 112 and may be indicated as an OFDM symbol index and a subcarrier index. A resource block 108 (hereinafter, referred to as an "RB") or a physical resource block (hereinafter, referred to as a "PRB") may be defined as $N_{symb}$ consecutive OFDM symbols 102 in the time domain, and $N_{RB}$ consecutive subcarriers 110 in the frequency domain. Accordingly, $N_{symb} \times N_{RB}$ REs 112 constitute one RB 108.

In general, a minimum transmission unit of data is the RB unit. In the 5G or NR system, in general, $N_{symb}=14$, $N_{RB}=12$, and $N_{BW}$ may be proportional to the bandwidth of a system transmission bandwidth. A data rate may increase in proportion to the number of RBs scheduled to a terminal. In the 5G or NR system, in the case of a frequency division duplex (FDD) system in which the downlink and the uplink are divided and operated by frequency, a downlink transmission bandwidth and an uplink transmission bandwidth may be different. A channel bandwidth indicates a radio frequency (RF) bandwidth corresponding to a system transmission bandwidth. Table 1 below shows a correspondence relation between the channel bandwidth and the system transmission bandwidth defined in an LTE system that is a 4th generation wireless communication prior to the 5G or NR system. For example, in the LTE system having a 10 MHz channel bandwidth, a transmission bandwidth includes 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The 5G or NR system may operate in a channel bandwidth greater than that of the LTE system suggested in Table 1. Table 2 shows a correspondence relation between the system transmission bandwidth, the channel bandwidth, and subcarrier spacing (SCS) in the 5G or NR system.

TABLE 2

| SCS [kHz] | Channel bandwidth $BW_{Channel}$ [MHz] | | | | | | | | | |
|---|---|---|---|---|---|---|---|---|---|---|
| | 5 | 10 | 15 | 20 | 25 | 40 | 50 | 60 | 80 | 100 |
| Maximum Transmission bandwidth $N_{RB}$ 15 | 25 | 52 | 79 | 106 | 133 | 216 | 260 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

In the 5G or NR system, scheduling information on downlink data or uplink data is transferred from a base station to a terminal through downlink control information (DCI). The DCI is defined according to various formats, and may indicate, according to each format, whether the information is scheduling information (UL grant) on uplink data or scheduling information (DL grant) on downlink data, whether the information is compact DCI, the control information size of which is small, whether spatial multiplexing using multiple antennas is applied, whether the information is DCI for power control, etc. For example, DCI format 1_1, which is scheduling control information (DL grant) on downlink data, may include at least one of the following pieces of control information.

Carrier indicator: This indicates the frequency carrier on which data is transmitted.

DCI format indicator: This is an indicator for indicating whether the DCI is for a downlink or an uplink.

Bandwidth part (BWP) indicator: This indicates a BWP in which transmission is performed.

Frequency-domain resource assignment: This indicates an RB of a frequency domain, which is assigned for data transmission. A resource to be expressed is determined according to a system bandwidth and a resource assignment scheme.

Time-domain resource assignment: This indicates a slot and an OFDM symbol of the slot, in which a data-related channel is to be transmitted.

VRB-to-PRB mapping: This indicates a mapping scheme by which a virtual RB (VRB) index is mapped to a physical RB (PRB) index.

Modulation and coding scheme (MCS): This indicates a modulation scheme and a coding rate used for data transmission. That is, this may indicate information relating to whether the modulation scheme is quadrature phase shift keying (QPSK), 16 quadrature amplitude modulation (QAM), 64 QAM, or 256 QAM, and may indicate a coding rate value indicating transport block size (TBS) and channel coding information.

Code-block group (CBG) transmission information: This indicates information on a CBG to be transmitted when CBG retransmission is configured.

HARQ process number: This indicates a process number of HARQ.

New data indicator: This indicates whether HARQ transmission is initial transmission or retransmission.

Redundancy version: This indicates the redundancy version of HARQ.

Transmission power control (TPC) command for physical uplink control channel (PUCCH): This indicates a TPC command for the PUCCH serving as an uplink control channel PDSCH-to-HARQ_feedback timing indicator $K_1$: This indicates configuration information relating to a slot in which a PUCCH for reporting HARQ-ACK for a PDSCH is transmitted (3 bits).

In the case of PUSCH transmission above, information on time-domain resource assignment may be transferred via information on a slot in which a PUSCH is transmitted, a start OFDM symbol position S in the corresponding slot, and the number L of OFDM symbols to which the PUSCH is mapped. In the above, S may be a relative position from the start of a slot, L may be the number of consecutive OFDM symbols, and S and L may be determined based on a start and length indicator value (SLIV) defined in Equation 1 below.

If $(L-1) \leq 7$ then SLIV 14·$(L-1)$+$S$ else SLIV=14·$(14-L+1)$+$(14-1-S)$ where $0<L\leq14-S$     Equation 1

Generally, the 5G or NR system may receive, through RRC configuration, configuration of a table in which an SLIV value, a PUSCH mapping type, and information on a slot in which a PUSCH is transmitted are included in one row. Later, in the time-domain resource assignment of the DCI, by indicating an index value in the table configured as above, a base station may transmit, to a terminal, the SLIV value, the PUSCH mapping type, and information on the slot in which the PUSCH is transmitted.

In the 5G or NR system, the PUSCH mapping type is defined as type A and type B. In the PUSCH mapping type A, the first OFDM symbol among demodulation reference signal (DMRS) OFDM symbols is located in the second or the third OFDM symbol in a slot. In the PUSCH mapping type B, the first OFDM symbol among DMRS OFDM symbols is located in the first OFDM symbol in a time domain resource assigned via PUSCH transmission. The PUSCH time domain resource assignment scheme described above may be identically applied to PDSCH time-domain resource assignment.

The DCI may be subjected to a channel coding and modulation process, and may then be transmitted through a physical downlink control channel (PDCCH) which is a downlink physical control channel.

Generally, the DCI is scrambled with a specific radio network temporary identifier (RNTI) (or a terminal identifier), independently from each terminal, a cyclic redundancy check (CRC) is added thereto, and channel coding is performed, whereby each independent PDCCH is configured and transmitted. The PDCCH is mapped and transmitted in a control resource set (CORESET) configured for the terminal.

The downlink data may be transmitted through a physical downlink shared channel (PDSCH) serving as a physical channel for downlink data transmission. The PDSCH may be transmitted after the control channel transmission interval, and scheduling information such as a specific mapping position and modulation scheme in the frequency domain is determined based on DCI transmitted through the PDCCH.

Via an MCS in the control information included in the DCI, a base station may report, to a terminal, the modulation scheme applied to a PDSCH to be transmitted, and the size (TBS) of data to be transmitted. In an embodiment, the MCS may be configured of 5 bits or more or fewer bits. The TBS corresponds to a size before channel coding for error correction is applied to data (transport block, TB) to be transmitted by a base station.

In the disclosure, a TB may include a medium access control (MAC) header, a MAC control element (MAC CE), one or more MAC service data units (SDUs), and padding bits. Alternatively, the TB may indicate the unit of data, which allows a drop from a MAC layer to a physical layer, or a MAC protocol data unit (MAP PDU).

The modulation scheme supported in the 5G or NR system is QPSK, 16 QAM, 64 QAM, and 256 QAM, wherein modulation orders ($Q_m$) thereof correspond to 2, 4, 6, and 8, respectively. That is, 2 bits per symbol for QPSK modulation, 4 bits per OFDM symbol for 16 QAM, and 6 bits per symbol for 64 QAM may be transmitted, and 8 bits per symbol may be transmitted for 256 QAM.

In the 5G or NR system, when the terminal is scheduled for the PDSCH or the PUSCH via the DCI and a time resource assignment field index m included in the DCI is indicated, a combination of DMRS type A position information corresponding to m+1, PDSCH mapping type information, a slot index $K_0$, a data resource start symbol S, and a data resource assignment length L is indicated from a table showing time-domain resource assignment information. For example, Table 3 is a table including normal cyclic prefix-based time-domain resource assignment information.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |

TABLE 3-continued

| Row index | dmrs-TypeA-Position | PDSCH mapping type | $K_0$ | S | L |
|---|---|---|---|---|---|
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position where DMRS is transmitted in one slot indicated by a system information block (SIB) that is one of terminal common control information. A possible value for the field is 2 or 3. When the total number of symbols constituting one slot is 14 and a first symbol index is 0, 2 indicates a third symbol and 3 indicates a fourth symbol. In Table 3, PDSCH mapping type is information indicating a position of DMRS in a scheduled data resource area. When the PDSCH mapping type is A, the DMRS is transmitted or received at a symbol position always determined via dmrs-typeA-Position, regardless of an assigned data time-domain resource. When the PDSCH mapping type is B, the DMRS is always transmitted or received in a first symbol among an assigned data time-domain resource. That is, the PDSCH mapping type B does not use information of dmrs-typeA-Position.

In Table 3, $K_0$ indicates an offset of a slot index to which a PDCCH belongs, wherein DCI is transmitted the PDCCH, and a slot index to which a PDSCH or a PUSCH scheduled in the DCI belongs. For example, when the slot index of the PDCCH is n, the slot index of the PDSCH or the PUSCH scheduled by the DCI of PDCCH is n+$K_0$. In Table 3, S denotes a start symbol index of a data time-domain resource in one slot. The range of possible values of S is 0 to 13, based on a normal cyclic prefix. In Table 3, L denotes a data time-domain resource interval length in one slot. The range of possible values of L is 1 to 14. However, possible values of S and L may be determined according to Equation 2 and Table 4 or 5. Table 3 may be values used by the terminal as default before time resource assignment information is received via terminal specific or terminal common higher-layer signaling. For example, DCI format 0_0 or 1_0 may always use Table 3 as a default time resource area value.

Table 3 indicates a PDSCH time-domain resource assignment value, and $K_2$ is used instead of $K_1$ for PUSCH time-domain resource assignment. Table 4 below is an example of a PUSCH time-domain resource assignment table.

TABLE 4

| Row index | PUSCH mapping type | $K_2$ | S | L |
|---|---|---|---|---|
| 1 | Type A | j | 0 | 14 |
| 2 | Type A | j | 0 | 12 |

TABLE 4-continued

| Row index | PUSCH mapping type | $K_2$ | S | L |
|---|---|---|---|---|
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 1 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Table 5 below is a table showing a possible combination of S and L based on whether cyclic prefix is normal or extended and whether the PDSCH mapping type is type A or type B.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

Table 6 below is a table showing a possible combination of S and L based on whether cyclic prefix is normal or extended and whether the PUSCH mapping type is type A or Type B.

TABLE 6

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 11} | {1, . . . , 12} | {1, . . . , 12} |

Each index in Table 3 may be configured via higher-layer signaling parameter PDSCH-TimeDomain ResourceAllocationList or PUSCH-TimeDomainResourceAllocationList.

PDSCH-TimeDomainResourceAllocationList includes one or more higher-layer signaling parameters PDSCH-TimeDomainResourceAllocation, and PDSCH-TimeDomainResourceAllocation includes $k_0$, mappingtype, and startSymbolAndLength. The range of a possible value of $k_0$ is 0 to 32. Mappingtype may be type A or type B. The range of a possible value of StartSymbolAndLength may be 0 to 127. As described above, when mappingtype is type A, a symbol position of DMRS follows a value indicated in dmrs-typeA-Position.

PUSCH-TimeDomainResourceAllocationList includes one or more higher-layer signaling parameters PUSCH-TimeDomainResourceAllocation, and PUSCH-TimeDomainResourceAllocation includes $k_2$, mapping type, and startSymbolAndLength. The range of $k_2$ is 0 to 32. Mappingtype may be type A or type B. The range of a possible value of StartSymbolAndLength may be 0 to 127. As described above, when mappingtype is type A, a symbol position of DMRS follows a value indicated in dmrs-typeA-Position.

The PDSCH-TimeDomainResourceAllocation or the PUSCH-TimeDomainResourceAllocation is a time-domain resource assignment scheme of a PDSCH or a PUSCH in one slot. The higher-layer signaling aggregationFactorDL denotes the number of slots in which a value of PDSCH-TimeDomainResourceAllocation applied to one slot is repeatedly transmitted. The higher-layer signaling aggregationFactorUL denotes the number of slots in which a value of PUSCH-TimeDomainResourceAllocation applied to one slot is repeatedly transmitted. The range of possible values of aggregationFactorDL and aggregationFactorUL is {1,2, 4,8}. For example, when the aggregationFactorDL is 8, it means that one of the possible values of PDSCH-TimeDomainResourceAllocation is repeatedly transmitted over total 8 slots. However, when at least a part of symbols among the symbols applied to PDSCH-TimeDomainResourceAllocation in a particular slot is an uplink symbol, PDSCH transmission and reception of the particular slot is omitted. Similarly, when at least a part of symbols among the symbols applied to PUSCH-TimeDomainResourceAllocation in a particular slot is a downlink symbol, PUSCH transmission and reception of the particular slot is omitted.

Figure 2:
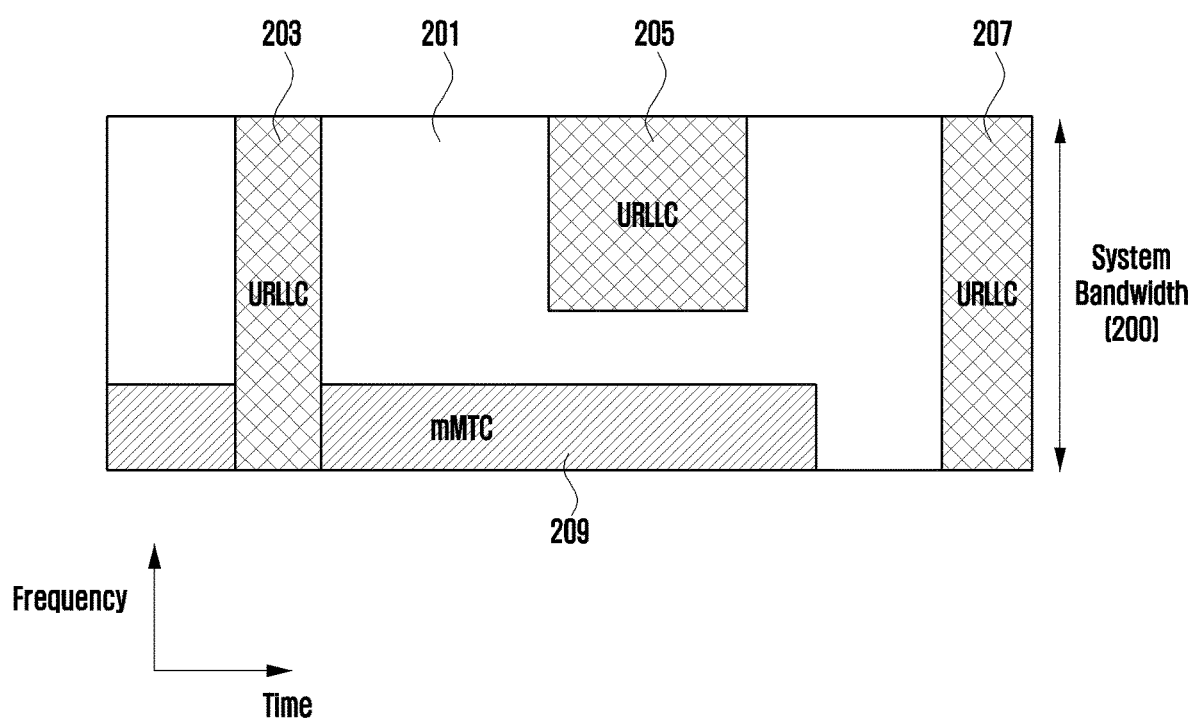
FIG. 2 illustrates a scheme of assigning eMBB data, URLLC data, and mMTC data in a time-frequency resource area in a 5G or NR system according to an embodiment of the disclosure.

FIG. 2 illustrates a scheme of assigning eMBB data, URLLC data, and mMTC data in a time-frequency resource area in a 5G or NR system according to an embodiment of the disclosure.

Referring to FIG. 2, the eMBB data, the URLLC data, and the mMTC data may be assigned in an entire system bandwidth 200. When URLLC data 203, 205 and 207 are generated and need to be transmitted while eMBB data 201 and mMTC data 209 are assigned and transmitted in a particular frequency band, the URLLC data 203, 205 and 207 may be transmitted by emptying the portion in which the eMBB data 201 and the mMTC data 209 have been already allocated, or without transmitting the same. In the above services, the URLLC needs to reduce a delay time, the URLLC data may be assigned and transmitted to a portion of a resource to which the eMBB or the mMTC is assigned. When the URLLC is additionally assigned and transmitted in the resource to which the eMBB is assigned, the eMBB data may not be transmitted in a redundant time-frequency resource, and thus transmission performance of the eMBB data may be decreased. That is, an eMBB data transmission failure may occur due to URLLC data assignment.

The NR system adopts a hybrid automatic repeat request (HARQ) scheme of retransmitting corresponding data in a physical layer when a decoding failure occurs in initial transmission. According to the HARQ scheme, when a receiver fails to precisely decode data, the receiver transmits information (negative acknowledgement (NACK)) notifying a transmitter of the decode failure, to the transmitter so that the transmitter can retransmit the corresponding data in the physical layer. The receiver combines the data retransmitted by the transmitter with the data for which decoding has previously failed, thereby increasing data reception performance. Furthermore, when the receiver accurately decodes data, the receiver transmits information (acknowledgement (ACK)) notifying the transmitter of a decoding success, to the transmitter so that the transmitter can transmit new data.

Hereinafter, in the disclosure, described is a method and apparatus for transmitting HARQ-ACK feedback for downlink data transmission and, more specifically, a method for configuration HARQ-ACK feedback bits when a terminal transmits multi-HARQ-ACK in one slot in an uplink.

In a wireless communication system, especially in the NR system, a base station may configure one component carrier (CC) or multiple CCs for a terminal in order to perform downlink transmission. In addition, a downlink transmission and uplink transmission slot and symbol may be configured to each CC. When the downlink data PDSCH is scheduled, at least one of timing information of a slot to which the PDSCH is mapped, information on a position of a start symbol to which the PDSCH is mapped in the corresponding slot, and information on the number of symbols to which the PDSCH is mapped may be transmitted via a particular bit field of DCI. Furthermore, the downlink data signal PDSCH is transmitted, and the HARQ-ACK feedback is transferred from the terminal to the base station after $K_1$ slot. $K_1$ information, which corresponds to information on a timing at which HARQ-ACK is transmitted, is transmitted via DCI, and a candidate set of possible $K_1$ values is transmitted via higher-layer signaling, and one of the candidate set is determined via the DCI.

When a semi-static HARQ-ACK codebook is configured for the terminal, the terminal may determine a table including slot information $K_0$ to which a PDSCH is mapped, start symbol information, number of symbols, or length information, and may determine a feedback bit (or a HARQ-ACK codebook size) to be transmitted by $K_1$ candidate values indicating HARQ-ACK feedback timing information for the PDSCH. The table including slot information to which a PDSCH is mapped, start symbol information, number of symbols, or length information may follow a default value, for the base station may configure the table for the terminal.

When a dynamic HARQ-ACK codebook is configured for the terminal, the terminal may determine an HARQ-ACK feedback bit (or a HARQ-ACK codebook size) to be transmitted by the terminal, by using downlink assignment indicator (DAI) information included in the DCI in a slot in which HARQ-ACK information is transmitted by values of $K_0$ and $K_1$, wherein $K_0$ indicates information on a slot to which the PDSCH is mapped, and $K_1$ indicates HARQ-ACK feedback timing information for PDSCH.

Figure 3:
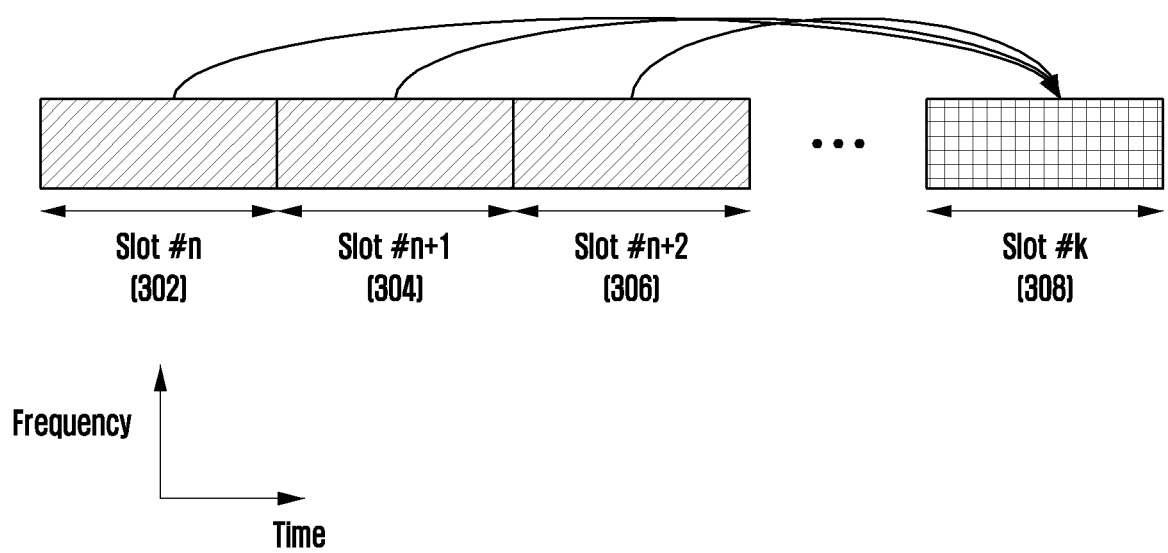
FIG. 3 illustrates a semi-static HARQ-ACK codebook configuration scheme in an NR system according to an embodiment of the disclosure.

FIG. 3 illustrates a semi-static HARQ-ACK codebook configuration scheme in an NR system according to an embodiment of the disclosure.

In the case where the HARQ-ACK PUCCH that a terminal can transmit within one slot is limited to one, when the terminal receives a semi-static HARQ-ACK codebook higher-layer signal configuration, the terminal reports HARQ-ACK information relating to PDSCH reception or SPS PDSCH release in the HARQ-ACK codebook in a slot indicated by the value of the PDSCH-to-HARQ_feedback timing indicator in DCI format 1_0 or DCI format 1_1. The terminal reports the value of the HARQ-ACK information bit in the HARQ-ACK codebook as a NACK in a slot not indicated by the PDSCH-to-HARQ_feedback timing indicator field in DCI format 1_0 or DCI format 1_1. When the terminal reports only one SPS PDSCH release or HARQ-ACK information relating to one PDSCH reception in $M_{A,\,c}$ cases for candidate PDSCH reception, and the report is scheduled by DCI format 1_0 including information indicating that a counter DAI field is 1 _in the Pcell, the terminal determines one HARQ-ACK codebook for the SPS PDSCH release or the PDSCH reception.

Otherwise, the HARQ-ACK codebook determination scheme according to the above-described scheme is followed.

Assuming that a set of PDSCH reception candidate cases in the serving cell c is $M_{A,\,c}$, $M_{A,\,c}$ may be obtained in the following [pseudo-code 1] stages.

[Start pseudo-code 1]

Stage 1: Initialize j to 0 and $M_{A,\,c}$ to an empty set. Initialize k, which is a HARQ-ACK transmission timing index, to 0.

Stage 2: Configure R as a set of rows in a table including slot information to which a PDSCH is mapped, start symbol information, number of symbols, or length information. When the PDSCH-capable mapping symbol indicated by each value of R is configured as the UL symbol according to the DL and UL configurations configured in the higher layer, the corresponding row is deleted from R.

Stage 3-1: The terminal may receive one PDSCH for unicast in one slot, and when R is not an empty set, one is added to the set $M_{A,\,c}$ Stage 3-2: When the terminal may receive more than one PDSCH for unicast in one slot, the number of PDSCHs that can be allocated to different symbols in the calculated R is counted and the corresponding number is added to $M_{A,\,c}$ Stage 4: Start again from stage 2 by increasing k by 1.

[End Pseudo-Code 1]

Referring to FIG. 3, taking the above pseudo-code 1 as an example, in order to perform HARQ-ACK PUCCH transmission in slot #k 308, all slot candidates capable of PDSCH-to-HARQ-ACK timing which can indicate slot #k 308 are considered. In FIG. 3, it is assumed that only PDSCHs scheduled in slot #n 302, slot #n+1 (304), and slot #n+2 (306) may perform HARQ-ACK transmission in slot #k 308 by a combination of possible PDSCH-to-HARQ-ACK timings. In addition, the maximum number of PDSCHs that can be scheduled for each slot is derived in consideration of information indicating whether a symbol in a slot is a downlink or an uplink, and time-domain resource configuration information of a PDSCH that can be scheduled in each of slots 302, 304, and 306. For example, when the maximum scheduling is possible for 2 PDSCHs in slot 302, 3 PDSCHs in slot 304, and 2 PDSCHs in slot 306, the maximum number of PDSCHs included in the HARQ-ACK codebook transmitted in slot 308 is seven in total. This is called cardinality of the HARQ-ACK codebook.

Figure 4:
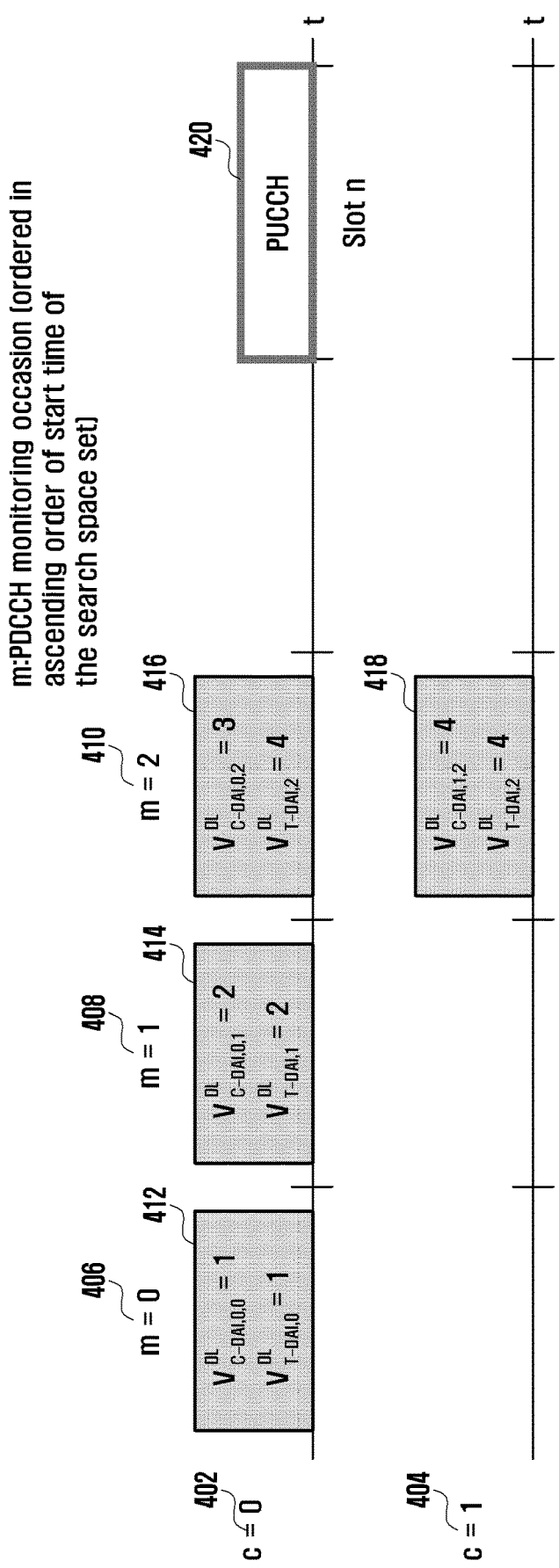
FIG. 4 illustrates a dynamic HARQ-ACK codebook configuration scheme in an NR system according to an embodiment of the disclosure.

FIG. 4 illustrates a dynamic HARQ-ACK codebook configuration scheme in an NR system according to an embodiment of the disclosure.

Based on a PDSCH-to-HARQ_feedback timing value for PUCCH transmission of HARQ-ACK information at slot n for PDSCH reception or SPS PDSCH release, and $K_0$ that is transmission slot position information of the PDSCH for scheduling in DCI format 1_0 or 1_1, the terminal transmits HARQ-ACK information transmitted within one PUCCH in corresponding slot n. Specifically, for the described HARQ-ACK information transmission, based on a DAI included in DCI indicating PDSCH or SPS PDSCH release, the terminal determines the HARQ-ACK codebook of the PDCCH transmitted at the slot determined by $K_0$ and the PDSCH-to-HARQ feedback timing.

The DAI includes a counter DAI and a total DAI. The counter DAI is information in which the HARQ-ACK information corresponding to the PDSCH scheduled in DCI format 1_0 or DCI format 1_1 indicates a position in the HARQ-ACK codebook. Specifically, a value of the counter DAI in the DCI format 1_0 or DCI format 1_1 indicates a cumulative value of PDSCH reception or SPS PDSCH release scheduled by DCI format 1_0 or DCI format 1_1 in particular cell c. The cumulative value is configured based on a PDCCH monitoring occasion and a serving cell in which the scheduled DCI exists.

The total DAI is a value indicating the size of the HARQ-ACK codebook. Specifically, a value of the total DAI refers to the total number of PDSCH or SPS PDSCH releases, which have been scheduled at a previous time including a time point (a PDCCH monitoring occasion) at which the DCI has been scheduled. In addition, the total DAI may be used when HARQ-ACK information in serving cell c also includes HARQ-ACK information relating to the PDSCH scheduled in another cell including serving cell c in a carrier aggregation (CA) situation. That is, there is no total DAI parameter in a system operating with one cell.

Referring to FIG. 4, an example is illustrated of a terminal operation related to a DAI when a dynamic HARQ-ACK codebook is used. FIG. 4 illustrates a change in values of the total DAI (T-DAI) and the counter DAI (C-DAI) indicated by DCI retrieved for each PDCCH monitoring occasion configured for each carrier, in the case where two carriers are configured for a terminal, and the terminal transmits, on a PUCCH 420, a HARQ-ACK codebook selected based on a DAI at an n-th slot of carrier 0 (402). First, each of the C-DAI and the T-DAI in the DCI retrieved at m=0 (406) indicates a value 412 of 1. Each of the C-DAI and the T-DAI in the DCI retrieved at m=1 (408) indicates a value 414 of 2. The C-DAI indicates a value 416 of 3 in DCI retrieved in carrier 0 (c=0) 402 of m=2 (410). The C-DAI indicates a value 418 of 4 in DCI retrieved in carrier 1 (c=1) 404 of m=2 (410). When carriers 0 and 1 are scheduled at the same monitoring occasion, all T-DAIs are indicated by 4.

In FIGS. 3 and 4, HARQ-ACK codebook determination is performed when only one PUCCH including HARQ-ACK information is transmitted in one slot. This is referred to as mode 1. As an example of a scheme of allowing one PUCCH transmission resource to be determined in one slot, when PDSCHs scheduled in different pieces of DCI are multiplexed and transmitted to one HARQ-ACK codebook in the same slot, a PUCCH resource selected for HARQ-ACK transmission is determined to be a PUCCH resource indicated by a PUCCH resource field indicated in DCI which last scheduled the PDSCH. That is, the PUCCH resource indicated by the PUCCH resource field indicated in DCI scheduled before the DCI is ignored.

In the following description, HARQ-ACK codebook determination method and devices in a case where two or more PUCCHs including HARQ-ACK information can be transmitted in one slot are defined. This is referred to as mode 2. It may be possible that the terminal operates only in mode 1 (only one HARQ-ACK PUCCH transmission in one slot) or operates only in mode 2 (one or more HARQ-ACK PUCCH transmissions in one slot). Alternatively, it may be possible that the terminal supporting both mode 1 and mode 2 is configured so that the base station operates in only one mode by higher-layer signaling, or a mode of the terminal is implicitly determined to be mode 1 or mode 2 by using a DCI format, an RNTI, a DCI-specific field value, scrambling, etc. For example, a PDSCH scheduled in DCI format A and pieces of HARQ-ACK information associated therewith may be based on mode 1, and a PDSCH scheduled in DCI format B and pieces of HARQ-ACK information associated therewith may be based on mode 2.

Figure 5:
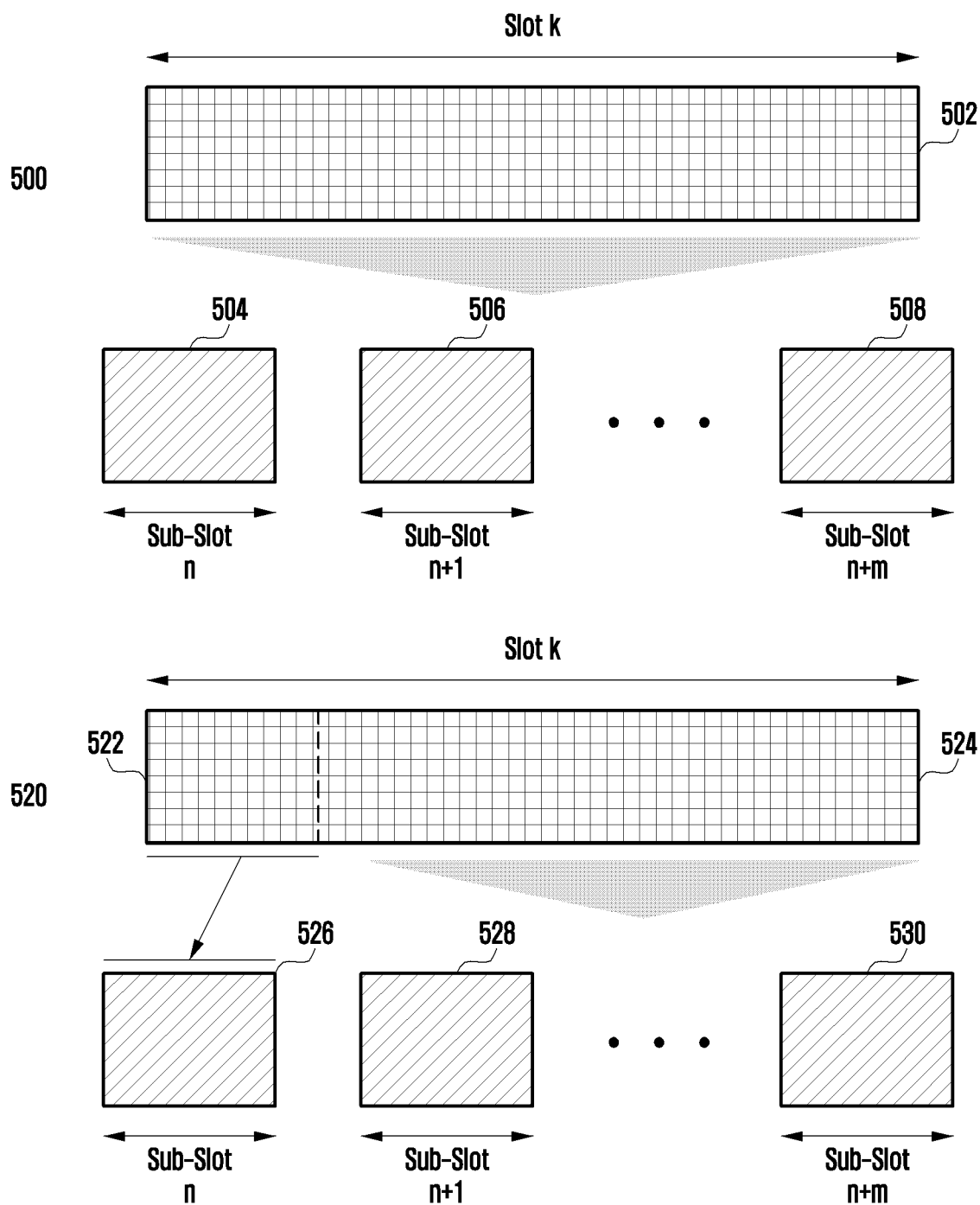
FIG. 5 illustrates a scheme of configuring a sub-slot of a terminal according to an embodiment of the disclosure.

FIG. 5 illustrates a scheme of configuring a sub-slot of a terminal according to an embodiment of the disclosure.

Referring to FIG. 5, a case 500 is illustrated in which one slot is divided into one or more sub-slots. Specifically, FIG. 5 shows a case in which particular slot k 502 is divided into m+1 sub-slots 504, 506, and 508. The sub-slots may have the same length or different lengths. For example, in a normal cyclic prefix, when one slot includes 14 OFDM symbols and one sub-slot includes seven OFDM symbols, one slot may be configured to be divided into two sub-slots, wherein each of the sub-slots has the same length of seven OFDM symbols. As in the above case, in order to divide one slot into sub-slots so that each of the sub-slots has the same length, the number of OFDM symbols for configuring a sub-slot in the normal cyclic prefix including 14 OFDM symbols is to be 1, 2, or 7, and the number of OFDM symbols for configuring a sub-slot in the extended cyclic prefix including 12 OFDM symbols is to be 1, 2, 3, 4, or 6.

It may not be possible to divide one slot into sub-slots so that the sub-slots have the same length and do not overlap each other when each of the sub-slots has a value other than the above-described number of OFDM symbols. For example, in the normal cyclic prefix in which one slot includes 14 OFDM symbols and one sub-slot includes three OFDM symbols, one slot includes five sub-slots, wherein each of four sub-slots has three OFDM symbols, and the remaining one sub-slot has two OFDM symbols. Accordingly, there is a need for a common rule to cover all the above-described conditions in a case where sub-slots have various sub-slot lengths. To this end, at least one of the following schemes may be utilized to configure sub-slots.

Scheme 1-1: A scheme of sequentially configuring sub-slots regardless of a symbol direction.

This scheme is a scheme of configuring sub-slots in a slot in an ascending order with reference to a symbol index. For example, in the normal cyclic prefix in which one slot 502 includes 14 symbols, when symbols 0 to 13 sequentially exist and the length of a sub-slot is configured to be three via a higher-layer signal, symbols 0, 1, and 2 may constitute one sub-slot 504, symbols 3, 4, and 5 may constitute the next sub-slot 506, symbols 6, 7, and 8 may constitute the next sub-slot, symbols 9, 10, and 11 may constitute the next sub-slot, and symbols 12 and 13 may constitute the next sub-slot 508. Accordingly, a total of five sub-slots may constitute one slot, wherein a sub-slot grouping reference, by which sub-slots are grouped starting from a sub-slot having the smallest symbol index, is used.

This may be generalized and represented as in the following expression. In the case where one slot includes K number of OFDM symbols and the length of one sub-slot is configured to be N via a higher-layer signal, the first $\lfloor K/N \rfloor$ sub-slots selected in an ascending order of symbol indices in the slot include sub-slots, each of which has the length of an N OFDM symbols, and the next $$\left[\left\lceil \frac{K}{N} \right\rceil - \left\lfloor \frac{K}{N} \right\rfloor\right]$$

sub-slots include sub-slots, each of which has the length of $$\left[K - \left\lfloor \frac{K}{N} \right\rfloor \times N\right]$$

OFDM symbols. That is, in FIG. 5, the sub-slot 504 has N OFDM symbols, and the sub-slot 508 has $$\left[K - \left\lfloor \frac{K}{N} \right\rfloor \times N\right]$$

OFDM symbols when $$\left[\left\lceil \frac{K}{N} \right\rceil - \left\lfloor \frac{K}{N} \right\rfloor\right]$$

is not 0, or has N OFDM symbols when $$\left[\left\lceil \frac{K}{N} \right\rceil - \left\lfloor \frac{K}{N} \right\rfloor\right]$$

is 0. In addition, in FIG. 5, when $$\left[\left\lceil \frac{K}{N} \right\rceil - \left\lfloor \frac{K}{N} \right\rfloor\right]$$

is not 0, m is $\lfloor K/N \rfloor$, and $$\left[\left\lceil \frac{K}{N} \right\rceil - \left\lfloor \frac{K}{N} \right\rfloor\right]$$

when is 0, m is $\lfloor K/N \rfloor - 1$. This scheme is a scheme in which sub-slots are configured based on determination no matter what symbols in a slot are downlink symbols, uplink symbols, or flexible symbols.

Scheme 1-2: A scheme of configuring sub-slots in a reverse order regardless of a symbol direction.

This scheme is a scheme of configuring sub-slots in a slot in a descending order with reference to a symbol index. For example, in the normal cyclic prefix in which one slot 502 includes 14 symbols, when symbols 0 to 13 sequentially exist and the length of a sub-slot is configured to be three via a higher-layer signal, symbols 11, 12, and 13 may constitute one sub-slot 504, symbols 8, 9, and 10 may constitute the next sub-slot 506, symbols 5, 6, and 7 may constitute the next sub-slot, symbols 2, 3, and 4 may constitute the next sub-slot, and symbols 0 and 1 may constitute the next sub-slot 508. Accordingly, a total of five sub-slots may constitute one slot, wherein a sub-slot grouping reference, by which sub-slots are grouped starting from a sub-slot having the largest symbol index, is used.

This may be generalized and represented as in the following expression. In the case where one slot includes K number of OFDM symbols and the length of one sub-slot is configured to be N via a higher-layer signal, the first $\lfloor K/N \rfloor$ sub-slots selected in a describing order (in a reverse order) of symbol indices in the slot include sub-slots, each of which has the length of an N OFDM symbols, and the next $$\left[\left\lceil \frac{K}{N} \right\rceil - \left\lfloor \frac{K}{N} \right\rfloor\right]$$

sub-slots include sub-slots, each of which has the length of $$\left[K - \left\lfloor \frac{K}{N} \right\rfloor \times N\right]$$

OFDM symbols. That is, in FIG. 5, the sub-slot 508 has N OFDM symbols, and the sub-slot 504 has $$\left[K - \left\lfloor \frac{K}{N} \right\rfloor \times N\right]$$

OFDM symbols when $$\left[\left\lceil \frac{K}{N} \right\rceil - \left\lfloor \frac{K}{N} \right\rfloor\right]$$

is not 0, or has N OFDM symbols when $$\left[\left\lceil \frac{K}{N} \right\rceil - \left\lfloor \frac{K}{N} \right\rfloor\right]$$

is 0. In addition, in FIG. 5, when $$\left[\left\lceil \frac{K}{N} \right\rceil - \left\lfloor \frac{K}{N} \right\rfloor\right]$$

is not 0, m is $\lfloor K/N \rfloor$, and when $$\left[\left\lceil \frac{K}{N} \right\rceil - \left\lfloor \frac{K}{N} \right\rfloor\right]$$

is 0, m is $\lfloor K/N \rfloor - 1$. This scheme is a scheme in which sub-slots are configured based on determination no matter what symbols in a slot are downlink symbols, uplink symbols, or flexible symbols.

Scheme 1-3: A scheme of sequentially configuring sub-slots in consideration of a symbol direction.

This is a scheme similar to scheme 1-1, but sub-slots are configured in one slot in consideration of symbol directions configured via a higher-layer signal in advance. In the 5G NR system, according to a basic pattern of a slot format configured via a terminal-common or terminal-specific higher-layer signal, front symbols in the slot are configured to be downlink symbols. Front symbols 522 of slot k in 520 of FIG. 5 are configured to be downlink symbols, and subsequent symbols 524 in slot k are configured to be flexible symbols or uplink symbols, via a higher-layer signal. The front symbols 522 configured to be downlink symbols in slot k may constitute one sub-slot regardless of a sub-slot value to be configured by another higher-layer signal, that is, regardless of the number of symbols that the sub-slot is to have. Accordingly, in FIG. 5, symbols 522 configured to be downlink symbols may be included in sub-slot n 526. For example, when the number of the symbols 522 configured to be downlink symbols is D, the length of sub-slot n is configured to be always D OFDM symbols regardless of a value to be configured via a higher-layer signal. Further, the subsequent symbols 524 remaining after excluding the symbols 522 configured to be downlink signals in slot k may be sequentially classified into sub-slots, based on the length of the sub-slot, the length being configured via a higher-layer signal.

For example, in the normal cyclic prefix in which the number of downlink symbols 522 in one slot is five, the next four symbols are configured to be flexible symbols, and the last five symbols are configured to be uplink symbols, via a higher-layer signal in advance, when the number of symbols of sub-slots is configured to be four OFDM symbols, via another higher-layer signal, sub-slot n 526 is configured to be five downlink symbols, and sub-slots, each of which has four OFDM symbols, may be sequentially configured by nine symbols including the subsequent flexible symbols and uplink symbols. Accordingly, sub-slot n+1 (528) may be a sub-slot having four OFDM symbols, and last sub-slot n+m (530) in the slot may be a sub-slot having one OFDM symbol. Specifically, according to scheme 1-3, in slot k, symbols 0, 1, 2, 3, and 4 are configured to be downlink symbols and constitute one sub-slot n 526, and the subsequent symbols are sequentially configured such that symbols 5, 6, 7, and 8 constitute another sub-slot n+1 (528), symbols 9, 10, 11, and 12 constitute another sub-slot, and last remaining symbol 13 constitutes sub-slot n+m (530), by a sub-slot value configured via a higher-layer signal. In this case, m is 3.

This may be generalized as follows. In the case where in a slot including K OFDM symbols, D OFDM symbols are configured to downlink symbols via a higher-layer signal, and the length of one sub-slot is configured to be N via another higher-layer signal, when there is at least one downlink symbol in the slot (D>0), the first one sub-slot may be configured to be a sub-slot having the length of D OFDM symbols, and when there is no downlink symbol in the slot (D=0), there is no sub-slot including D downlink symbols. The first $\lfloor (K-D)/N \rfloor$ sub-slots among the subsequent sub-slots, selected in an ascending order (or sequentially) of symbol indices in the slot include sub-slots, each of which has the length of an N OFDM symbols, and the next $$\left[\left\lceil \frac{K-D}{N} \right\rceil - \left\lfloor \frac{K-D}{N} \right\rfloor\right]$$

sub-slots include sub-slots, each of which has the length of $$\left[(K-D) - \left\lfloor \frac{K-D}{N} \right\rfloor \times N\right]$$

OFDM symbols. That is, in FIG. 5, the sub-slot 526 has N OFDM symbols, and the sub-slot 530 has $$\left[(K-D) - \left\lfloor \frac{K-D}{N} \right\rfloor \times N\right]$$

OFDM symbols when $$\left[\left\lceil \frac{K-D}{N} \right\rceil - \left\lfloor \frac{K-D}{N} \right\rfloor\right]$$

is not 0, or has N OFDM symbols when $$\left[\left\lceil \frac{K-D}{N} \right\rceil - \left\lfloor \frac{K-D}{N} \right\rfloor\right]$$

is 0. In addition, in FIG. 5, in the case where there is at least one downlink symbol in the slot (D>0), when $$\left[\left\lceil \frac{K-D}{N} \right\rceil - \left\lfloor \frac{K-D}{N} \right\rfloor\right]$$

is not 0, m is $\lfloor (K-D)/N \rfloor - 1$, and when $$\left[\left\lceil \frac{K-D}{N} \right\rceil - \left\lfloor \frac{K-D}{N} \right\rfloor\right]$$

is 0, m is $\lfloor (K-D)/N \rfloor$. In the case where there is no downlink symbol in the slot (D=0), when $$\left[\left\lceil \frac{K}{N} \right\rceil - \left\lfloor \frac{K}{N} \right\rfloor\right] i$$

is not 0, m is $\lfloor K/N \rfloor$, and when $$\left[\left\lceil \frac{K}{N} \right\rceil - \left\lfloor \frac{K}{N} \right\rfloor\right]$$

is 0, m is $\lfloor K/N \rfloor - 1$.

This scheme is a scheme in which sub-slots are configured based on determination according to whether symbols in a slot are downlink symbols, uplink symbols, or flexible symbols. This is a scheme which may be appropriate for a TDD environment in which an uplink and a downlink coexist in one frequency band. This may be also applicable to an FDD environment, and in this case, as D becomes 0 with reference to an uplink band, scheme 1-3 and scheme 1-1 may be the same.

Scheme 1-4: A scheme of configuring sub-slots in a reverse order in consideration of a symbol direction.

This is a scheme similar to scheme 1-2, but sub-slots are configured in one slot in consideration of symbol directions configured via a higher-layer signal in advance. In the 5G NR system, according to a basic pattern of a slot format configured via a terminal-common or terminal-specific higher-layer signal, front symbols in the slot are configured to be downlink symbols. Front symbols 522 of slot k in 520 of FIG. 5 are configured to be downlink symbols, and the subsequent symbols 524 in slot k are configured to be flexible symbols or uplink symbols, via a higher-layer signal. The front symbols 522 configured to be downlink symbols in slot k may constitute one sub-slot regardless of a sub-slot value to be configured by another higher-layer signal, that is, regardless of the number of symbols that the sub-slot is to have. Accordingly, in FIG. 5, symbols 522 configured to be downlink symbols may be included in sub-slot n 526. For example, when the number of the symbols 522 configured to be downlink symbols is D, the length of sub-slot n is configured to be always D OFDM symbols regardless of a value to be configured via a higher-layer signal. Further, the subsequent symbols 524 remaining after excluding the symbols 522 configured to be downlink signals in slot k may be classified into sub-slots in a reverse order, based on the length of the sub-slot, the length being configured via a higher-layer signal. For example, in the normal cyclic prefix in which the number of downlink symbols 522 in one slot is five, the next four symbols are configured to be flexible symbols, and the last five symbols are configured to be uplink symbols, via a higher-layer signal in advance, when the number of symbols of sub-slots is configured to be four OFDM symbols, via another higher-layer signal, sub-slot n 526 is configured to be five downlink symbols, and sub-slots, each of which has four OFDM symbols, may be configured in a reverse order by nine symbols including the subsequent flexible symbols and uplink symbols. Accordingly, sub-slot n+m (530) may be a sub-slot having four OFDM symbols, and sub-slot n+1 (528) in the slot may be a sub-slot having one OFDM symbol. Specifically, according to scheme 1-4, in slot k, symbols 0, 1, 2, 3, and 4 are configured to be downlink symbols and constitute one sub-slot n 526, and the subsequent symbols are configured in a reverse order such that symbols 10, 11, 12, and 13 constitute another sub-slot n+m (530), and symbols 6, 7, 8, and 9 constitute another sub-slot, and last remaining symbol 5 constitutes sub-slot n+1 (528), by a sub-slot value configured via a higher-layer signal. In this case, m is 3.

This may be generalized as follows. In a slot including K OFDM symbols, in the case where D OFDM symbols are configured to be downlink symbols via a higher-layer signal, and the length of one sub-slot is configured to be N via another higher-layer signal, when there is at least one downlink symbol in the slot (D>0), the first one sub-slot may be configured to be a sub-slot having the length of D OFDM symbols, and when there is no downlink symbol in the slot (D=0), there is no sub-slot including D downlink symbols. The $\lfloor (K-D)/N \rfloor$ sub-slots from the last of the subsequent sub-slots, selected in a descending order (or in a reverse order) of symbol indices in the slot include sub-slots, each of which has the length of an N OFDM symbols, and when there is a sub-slot including downlink symbols, the next $$\left[\left\lceil \frac{K-D}{N} \right\rceil - \left\lfloor \frac{K-D}{N} \right\rfloor\right]$$

sub-slots include sub-slots, each of which has the length of $$\left[(K-D) - \left\lfloor \frac{K-D}{N} \right\rfloor \times N\right]$$

OFDM symbols. That is, in FIG. 5, the sub-slot 530 has N OFDM symbols, and the sub-slot 528 has $$\left[(K-D) - \left\lfloor \frac{K-D}{N} \right\rfloor \times N\right]$$

OFDM symbols when $$\left[\left\lceil \frac{K-D}{N} \right\rceil - \left\lfloor \frac{K-D}{N} \right\rfloor\right]$$

is not 0, or has N OFDM symbols when $$\left[\left\lceil \frac{K-D}{N} \right\rceil - \left\lfloor \frac{K-D}{N} \right\rfloor\right]$$

is 0. In addition, in FIG. 5, in the case where there is at least one downlink symbol in the slot (D>0), $$\left[\left\lceil \frac{K-D}{N} \right\rceil - \left\lfloor \frac{K-D}{N} \right\rfloor\right]$$

when is not 0, m is $\lfloor (K-D)/N \rfloor +1$, and when $$\left[\left\lceil \frac{K-D}{N} \right\rceil - \left\lfloor \frac{K-D}{N} \right\rfloor\right]$$

is 0, m is $\lfloor (K-D)/N \rfloor$. In the case where there is no downlink symbol in the slot (D=0), when $$\left[\left\lceil \frac{K}{N} \right\rceil - \left\lfloor \frac{K}{N} \right\rfloor\right]$$

is not 0, m is $\lfloor K/N \rfloor$, and when $$\left[\left\lceil \frac{K}{N} \right\rceil - \left\lfloor \frac{K}{N} \right\rfloor\right]$$

is 0, m is $\lfloor K/N \rfloor -1$.

This scheme is a scheme in which sub-slots are configured based on determination according to whether symbols in a slot are downlink symbols, uplink symbols, or flexible symbols. This is a scheme which may be appropriate for a TDD environment in which an uplink and a downlink coexist in one frequency band. This may be also applicable to an FDD environment, and in this case, as D becomes 0 with reference to an uplink band, scheme 1-4 and scheme 1-2 may be the same.

Sub-slots in a slot are configured according to the above-described schemes, an index thereof and the number of OFDM symbols included in each sub-slot is to be determined according to each scheme. According to the corresponding scheme, the terminal may determine a sub-slot index to which a PDSCH scheduled via downlink control information belongs, and a sub-slot index for scheduling a PUCCH including HARQ-ACK information relating to the PDSCH. Specifically, the sub-slot index to which the PDSCH belongs is determined to be a sub-slot belonging to the last symbol (or the last time) of the scheduled PDSCH, and a $K_1$ (PDSCH-to-HARQ-ACK timing) value of downlink control information included in the same scheduling information includes a sub-slot interval according to a sub-slot value configured in advance via a higher-layer signal. For example, when $K_1$ is 1, a PUCCH resource including HARQ-ACK information relating to the PDSCH may be assigned in a sub-slot immediately subsequent to the sub-slot to which the PDSCH belongs, by another PUCCH resource indicator (PRI). Specifically, it may be assumed that a starting symbol index among various parameters indicated by the PRI is applied in a sub-slot indicated by the value of $K_1$. For example, when the starting symbol index is 0, it means the first OFDM symbol or an OFDM symbol index having the first uplink (or a flexible link) in the sub-slot indicated by the value of $K_1$.

In the Rel-15 NR, a slot unit is assumed by the granularity of the $K_1$ value, but in the NR supported by Rel-16, when the granularity of the $K_1$ value may vary depending on the length of the sub-slot, and the range of the corresponding value has the length of one symbol to 13 symbols, the length of symbols having common divisors of 14 (1, 2, and 7) in the case of the normal cyclic prefix, or the length of symbols having common divisors of 12 (1, 2, 3, 4, and 6) in the case of the extended cyclic prefix. Alternatively, the possible $K_1$ value in the normal cyclic prefix may be limited to 2 and 7, and the possible $K_1$ value in the extended cyclic prefix may be limited to 2 and 6. DCI to which the $K_1$ value having the variable granularity is applied corresponds to non-fallback DCI, and may be applicable to a DCI format for scheduling a PDSCH except for DCI format 1_1 or 1_0.

One of the above-described schemes or schemes of the next embodiment may be determined and used as, or may be interchangeably used with, a higher-layer signal or standard. Alternatively, other than the above-described schemes, sub-slots may be configured by the number of sub-slots included in a slot, not by the sub-slot length. For example, it may be configured in advance via a higher-layer signal that the number of sub-slots existing in one slot is N, and accordingly, the terminal may configure the number of OFDM symbols configured for each of sub-slots according to schemes 1-1 to 1-4 above. Specifically, when the number of OFDM symbols in a slot is K, the sub-slot length may be determined by at least one of [K/N], ⌊K/N⌋, or ⌈K/N⌉, and schemes 1-1 to 1-4 may be applicable according the corresponding length.

When a cyclic prefix configured in one BWP is a normal cyclic prefix, a terminal includes 14 symbols in one slot. Accordingly, in order have the same sub-slot length in one slot without departing beyond the slot border, it may be configured, via a higher-layer signal, that the number of symbols included in the sub-slot is to be limited to 2 or 7. For example, when the terminal receives higher-layer signal information related to the sub-slot, and the sub-slot length is the length of two symbols, it is assumed that a total of seven sub-slots exist in one slot. On the other hand, when a cyclic prefix configured in one BWP is an extended cyclic prefix, the terminal may include 12 symbols in one slot. Accordingly, in order have the same sub-slot length in one slot without departing beyond the slot border, it may be configured, via a higher-layer signal, that the number of symbols included in the sub-slot is to be limited to 2, 3, 4, or 6. Alternatively, since there are two sub-slot candidates for the normal cyclic prefix, there may be the same number of sub-slot candidates for the extended cyclic prefix. Accordingly, when configuring a BWP, the terminal may interpret sub-slot higher-layer information differently depending on cyclic prefix information. For example, when the terminal receives a normal cyclic prefix via a higher-layer signal, higher-layer information of the possible sub-slot length is {2, 7}, and when the terminal receives an extended cyclic prefix via a higher-layer signal, higher-layer information of the possible sub-slot length is {2, 6}. That is, the number indicating the sub-slot length is fixed to two in total, but a scheme of determining the sub-slot length as 6 or 7 is additionally determined by the cyclic prefix information configured via a higher-layer signal.

Figure 6A:
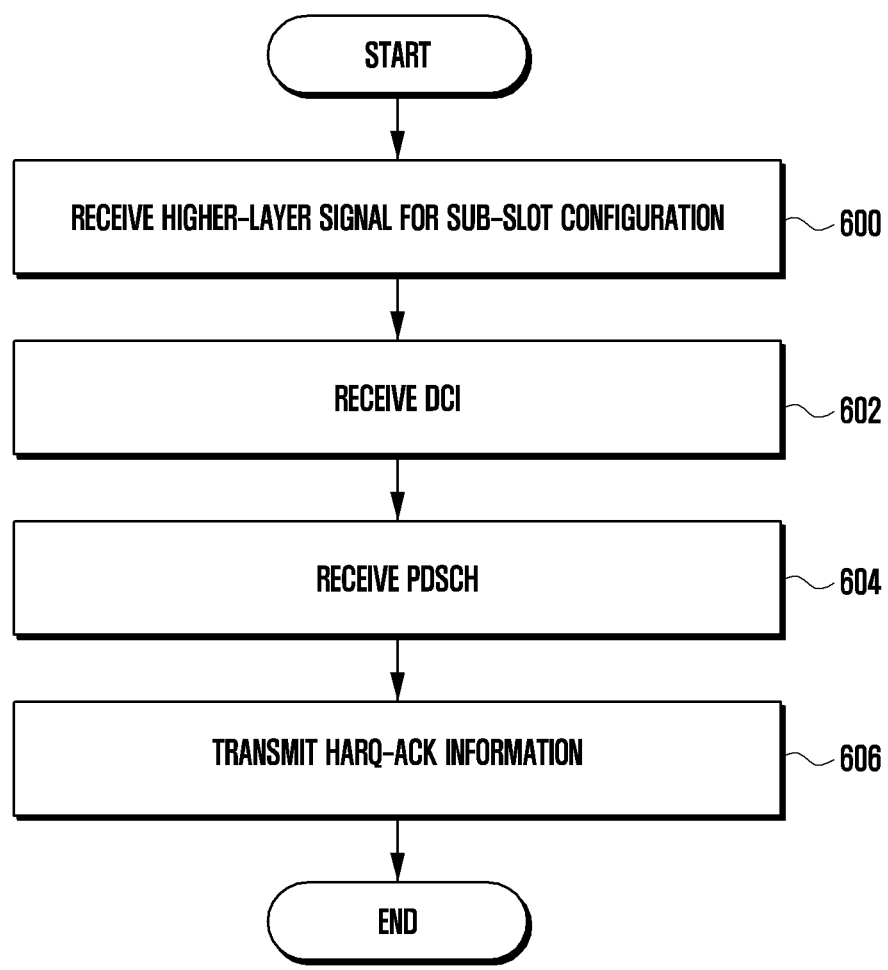
FIG. 6A is a flowchart that illustrates a scheme of transmitting uplink control information of downlink data reception by a terminal, by using sub-slot configuration and information according to an embodiment of the disclosure.

FIG. 6A is a flowchart that illustrates a scheme of transmitting uplink control information of downlink data reception by a terminal, by using sub-slot configuration and information according to an embodiment of the disclosure.

Referring to FIG. 6A, an example is illustrated of determining a sub-slot, through which HARQ-ACK information relating to a PDSCH is to be transmitted by a terminal, and transmitting the HARQ-ACK information, based on sub-slot configuration information configured via a higher-layer signal. The terminal acquires configuration information relating to a sub-slot via a higher-layer signal at operation 600. In this case, an example of the information may include a sub-slot length, the number of slots in one slot, or the granularity of a $K_1$ value indicating PDSCH-to-HARQ-ACK timing. After acquiring the information at operation 600, the terminal determines sub-slot information by using at least one of the schemes described in FIG. 5. Later, the terminal receives, through downlink control information, a resource area to which a PDSCH is assigned, and information on a PUCCH resource area to which HARQ-ACK information relating to the corresponding PDSCH is transmitted at operation 602. The sub-slot configuration information acquired in operation 600 may be applicable only to the case of DCI format 1_1 or 1_x, or may be applicable only to the case of DCI format 1_x including CRC scrambled with an MSC_RNTI (or a URLLC_RNTI). The terminal receives the PDSCH in the PDSCH resource area scheduled by the control information at operation 604. The terminal transmits the HARQ-ACK information relating to the PDSCH to the PUCCH resource area included in the control information at operation 606. In this case, when the information corresponds to DCI to which the sub-slot configuration is applied, the terminal determines that the PUCCH resource corresponds to a resource area indicated by a PRI in the $K_1^{th}$ sub-slot indicated by the DCI later, from a sub-slot to which the PDSCH belongs. For example, when the PDSCH belongs to sub-slot n, a PUCCH resource for transmitting the HARQ-ACK information is assigned to sub-slot n+$K_1$, based on the PRI. Specifically, the terminal may determine that startingsymbolindex indicated by the PRI corresponds to a value indicated with reference to the first OFDM symbol of a slot when $K_1$ is a slot unit, and may determine that startingsymbolindex indicated by the PRI corresponds to a value indicated with reference to the first OFDM symbol (or the first valid flexible or uplink symbol) of the sub-slot indicated by $K_1$ when $K_1$ is a sub-slot unit.

Figure 6B:
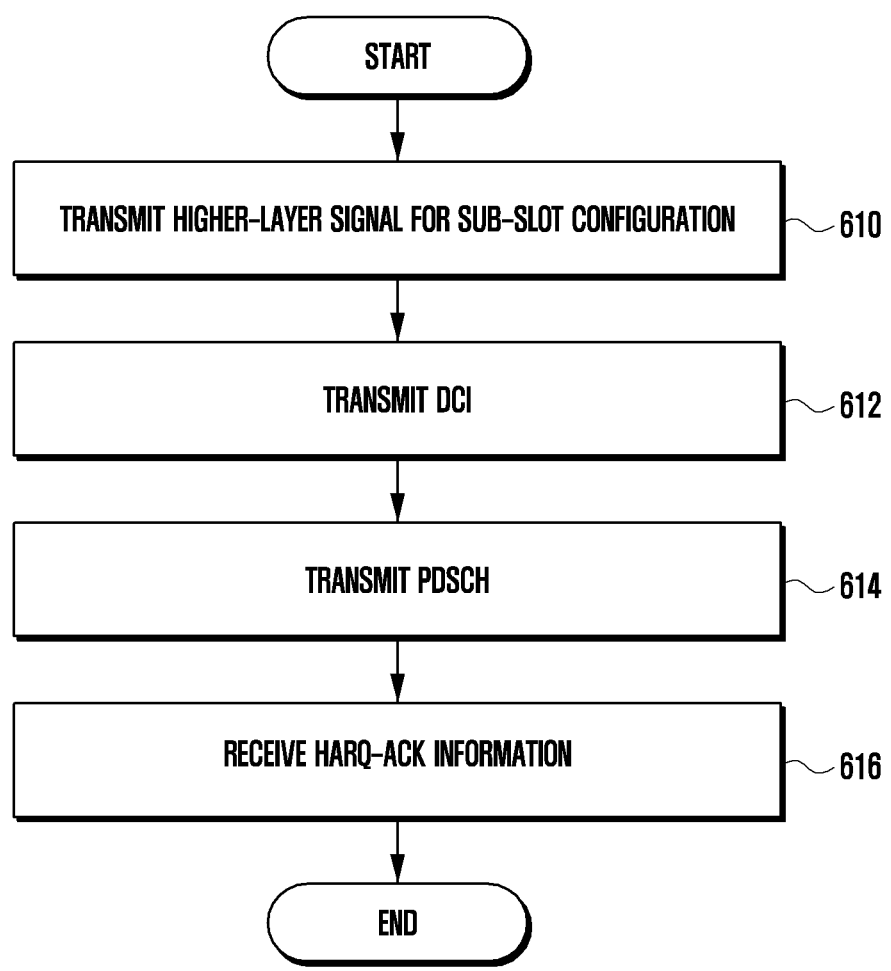
FIG. 6B is a flowchart that illustrates a scheme of receiving uplink control information of downlink data transmission by a base station, by using sub-slot configuration and information according to an embodiment of the disclosure.

FIG. 6B is a flowchart that illustrates a scheme of receiving uplink control information of downlink data transmission by a base station, by using sub-slot configuration and information according to an embodiment of the disclosure.

Referring to FIG. 6B, an example is illustrated of receiving HARQ-ACK information relating to a PDSCH in a sub-slot by a base station, based on sub-slot configuration information configured via a higher-layer signal. The base station transmits configuration information relating to a sub-slot via a higher-layer signal at operation 610. In this case, an example of the information may include a sub-slot length, the number of slots in one slot, or the granularity of a K1 value indicating PDSCH-to-HARQ-ACK timing. Later, the base station transmits, through downlink control information, a resource area to which the PDSCH is assigned, and information on a PUCCH resource area to which HARQ-ACK information relating to the corresponding PDSCH is transmitted at operation 612. The sub-slot configuration information transmitted in operation 610 may be applicable only to the case of DCI format 1_1 or 1_x, or may be applicable only to the case of DCI format 1_x including CRC scrambled with an MSC_RNTI (or a URLL-C_RNTI).

The base station transmits the PDSCH in the PDSCH resource area scheduled by the control information at operation 614. The base station receives the HARQ-ACK information relating to the PDSCH in the PUCCH resource area included in the control information at operation 616. In this case, when the information corresponds to DCI to which the sub-slot configuration is applied, the PUCCH resource may correspond to a resource area indicated by a PRI in the $K_1^{th}$ sub-slot indicated by the DCI later, from a sub-slot to which the PDSCH belongs. For example, when the PDSCH belongs to sub-slot n, a PUCCH resource for transmitting the HARQ-ACK information is assigned to sub-slot $n+K_1$, based on the PRI. Specifically, startingsymbolindex indicated by the PRI may correspond to a value indicated with reference to the first OFDM symbol of a slot when $K_1$ is a slot unit, and startingsymbolindex indicated by the PRI may correspond to a value indicated with reference to the first OFDM symbol (or the first valid flexible or uplink symbol) of the sub-slot indicated by $K_1$ when $K_1$ is a sub-slot unit.

The sub-slot setup and configuration schemes described in FIGS. 5, 6A, and 6B are used to support transmission or reception of PUCCH resources in units of sub-slots, the PUCCH resources including UCI such as HARQ-ACK information, a scheduling request (SR), or channel state information (CSI). In Rel-15 NR, the maximum two PUCCHs may be transmitted or received in one slot, and one the two PUCCHs includes HARQ-ACK information. Further, at least one of the two PUCCHs needs to be a long PUCCH format (PUCCH format 1, PUCCH format 3, or PUCCH format 4) which has the length equal to or longer than the length of four symbols. That is, in terms of transmission or reception of the HARQ-ACK, the terminal may transmit the maximum one PUCCH only in one slot, and thus even through the terminal receives multiple PDSCHs in one slot, the terminal configures one HARQ-ACK codebook to transmit the same as one PUCCH at once, rather separately reporting, to the base station, pieces of HARQ-ACK information of the multiple PDSCHs. Accordingly, a problem of relatively high latency in the first transmitted PDSCH among the multiple PDSCHs was found in services requiring low latency, such as URLLC, and to solve the problem, the sub-slot described in FIGS. 5, 6A, and 6B has been introduced. In the sub-slot-based operation, the restriction found in the slot-based operation is applied to a sub-slot based operation, and accordingly, the terminal is able to transmit a PUCCH including HARQ-ACK information for each sub-slot.

Figure 7:
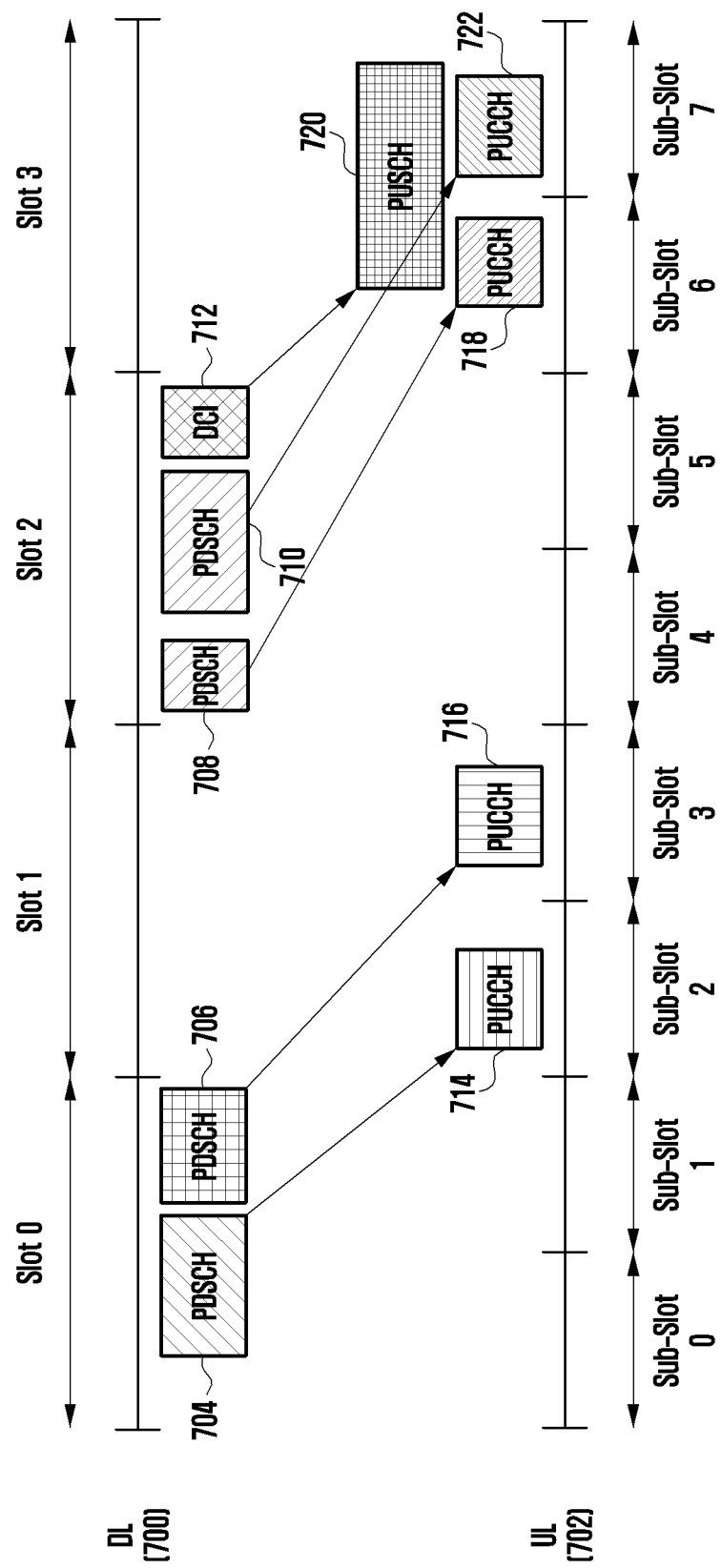
FIG. 7 illustrates an example of sub-slot-based control channel and slot-based data channel transmission or reception according to an embodiment of the disclosure.

FIG. 7 illustrates a process of transmitting, by a terminal, a PUCCH including sub-slot-based HARQ-ACK information relating to a PDSCH, as an example of the sub-slot-based operation. FIG. 7 illustrates an example of sub-slot-based control channel and slot-based data channel transmission or reception according to an embodiment of the disclosure.

FIG. 7 is applicable to both FDD and TDD and considers a BWP configured as the normal cyclic prefix. In addition, it is assumed that a sub-slot includes seven symbols. Accordingly, one slot includes two sub-slots. For example, slot 0 includes sub-slot 0 and sub-slot 1, slot 1 includes sub-slot 2 and sub-slot 3, slot 2 includes sub-slot 4 and sub-slot 5, and slot 3 includes sub-slot 6 and sub-slot 7.

Referring to FIG. 7, with regard to downlink (DL) 700 and uplink (UL) 702, HARQ-ACK information relating to a PDSCH 704 of slot 0 is transmitted via a PUCCH 714 of sub-slot 2, and HARQ-ACK information relating to a PDSCH 706 of slot 0 is transmitted through a PUCCH 716 of sub-slot 3. Specifically, information indicating a sub-slot to which the HARQ-ACK information relating to the PDSCH is transmitted is included in control information for scheduling the corresponding PDSCH, and is referred to as "PDSCH-to-HARQ-ACK feedback timing indicator ($K_1$)." When the terminal receives no configuration of a sub-slot higher-layer signal, a unit of $K_1$ is a slot unit. When the terminal receives configuration of a sub-slot higher-layer signal, a unit of $K_1$ is a sub-slot unit. Accordingly, in FIG. 7, the unit of $K_1$ corresponds to seven symbols. A sub-slot to which the PDSCH belongs is determined with reference to a sub-slot to which the last symbol of the PDSCH belongs. Accordingly, the PDSCH 704 belongs to sub-slot 1, and the PDSCH 706 belongs to sub-slot 1. Pieces of UCI of PUCCHs 714 and 716 through which the HARQ-ACK information is transmitted are subjected to encoding of HARQ-ACK information according to section 6.3 of the 3GPP standard TS 38.212.

In the case where the terminal is scheduled in advance that two PDSCHs 708 and 710 are scheduled and PUCCHs 718 and 722 which correspond to the two PDSCHs 708 and 710 and through HARQ-ACK information is transmitted are to be transmitted in sub-slot 6 and sub-slot 7, respectively, the base station may transmit DCI 712 for scheduling a PUSCH 720 in another PDCCH 722, and the corresponding PUSCH may be transmitted in slot 3, that is, over sub-slot 6 and 7. When the terminal may has no capability to perform simultaneous transmission of a PUCCH and a PUSCH in one cell, or when the terminal has capability to perform the simultaneous transmission, but receives, from the base station, no higher-layer signal configuration which allows the simultaneous transmission of the PUCCH and the PUSCH, the terminal allows pieces of HARQ-ACK information included in the PUCCHs 718 and 722 to piggyback on the PUSCH 720 so that the corresponding PUCCH 718 and 722 are not transmitted and the PUSCH 720 including the UCI intended to be transmitted through the PUCCHs are transmitted to the base station. In the conventional sense, it was assumed as a basic operation that one PUCCH including HARQ-ACK information always piggybacks on one PUCSH. Accordingly, when the HARQ-ACK information included each PUCCH piggybacks on (or is multiplexed to) one PUSCH, a new encoding rule to be applied thereto needs to be defined. In order to allow multiple PUCCHs including pieces of HARQ-ACK information to piggyback on one PUSCH, the following scheme may be considered.

When UCI piggybacks on the PUSCH, it means that a resource including the UCI is rate-matched and mapped to the PUSCH. When the PUSCH includes UL-SCH (or uplink data), the number Q' of resources including UCI is determined by a UCI size O, a CRC size L, a beta offset β, the number M of resources used for PUSCH data transmission, a PUSCH information size K, and alpha α. When the PUSCH includes no UL-SCH, the number O' of resources including UCI is determined by a UCI size O, a CRC size L, a beta offset â, a PUSCH modulation order Q, a PUSCH code rate R, and alpha α. Some values of the beta offset are configured via a higher-layer signal, one value thereof is indicated via an L1 signal, and the range of values is an integer having a value equal to or larger than 0 The number M of resources used for PUSCH data transmission corresponds to resource element REs remaining after excluding an RE used for DMRS and PT-RS transmission or reception. The alpha α is a parameter configured, via a higher-layer signal, to limit the maximum resource amount by which UCI can be mapped within the PUSCH resource. The unit of each of the UCI size, the CRC size, and the PUSCH information size is a bit. The UCI may be at least one of HARQ-ACK, CSI part 1, or CSI part 2.

As shown in FIG. 7, when the PUCCHs configured to be transmitted on different sub-slots overlap one PUCSH, and the corresponding PUCCHs have the same type of UCI, for example, HARQ-ACK information, in determining the number Q' of resources (this may be REs) including the UCI to be rate-matched to the PUSCH (or the number of modulation symbols for each layer), O is considered as a total sum of UCI sizes of the PUCCHs overlapping the PUSCH. For example, O may be obtained as follows: $O=O_{UCI\_1}+O_{UCI\_2}+\ldots+O_{UCI\_n}$. Each piece of UCI corresponds to UCI scheduled to be transmitted through each PUCCH, and $O_{UCI\_n}$ may be a bit number of the UCI scheduled to be transmitted on $PUCCH_n$. In addition, the CRC size L may be a value determined based on the total sum of UCI sizes of the PUCCHs overlapping the PUSCH ($L=L_{UCI\_total}$, wherein $L_{UCI\_total}$ is the number of CRC bits added to the total UCI to be transmitted on the PUSCH), or may be a total sum of respective CRC sizes determined for respective UCI sizes of the PUCCHs overlapping the PUSCH ($L=L_{UCI\_1}+L_{UCI\_2}+\ldots+L_{UCI\_n}$, wherein $L_{UCI\_n}$ is the number of CRC bits added to the UCI scheduled to be transmitted on the $PUCCH_n$).

In addition, in the case where the pieces of UCI in the PUCCHs overlapping the PUSCH have different requirements (latency or reliability), or include different priorities, when the number Q' of resources including UCI rate-matched to the PUSCH is determined, different beta offset values or different scaling values may be applied to the pieces of UCI included in the PUCCHs having different priority information values. The multiple different beta offset values and the multiple different scaling values may be provided in advance via a higher-layer signal or an L1 signal. For example, when each CRC bit is added to the UCI to be transmitted through each PUCCH, Q' may be determined according to $(O_{UCI\_1}+L_{UCI\_1})\beta_{UCI\_1}+(O_{UCI\_2}+L_{UCI\_2})\beta_{UCI\_2}+\ldots(O_{UCI\_n}+L_{UCI\_n})\beta_{UCI\_n}$. Alternatively, when the CRC bits are added to the sum of the pieces UCI to be transmitted through the respective PUCCHs, Q' may be determined according to $\ldots O_{UCI\_1}\beta_{UCI\_1}+O_{UCI\_2}\beta_{UCI\_2}+\ldots+O_{UCI\_n}\beta_{UCI\_n}+L_{UCI\_x}\beta_{UCI\_x}$. $L_{UCI\_x}$ is a value determined by the sum of all UCI bits ($O_{UCI\_1}+O_{UCI\_2}+\ldots+O_{UCI\_n}$). $\beta_{UCI\_x}$ is a value determined by at least one of $\mathrm{mean}\{\beta_{UCI\_1},\beta_{UCI\_2},\ldots,\beta_{UCI\_n}\}$, $\mathrm{min}\{\beta_{UCI\_1},\beta_{UCI\_2},\ldots,\beta_{UCI\_n}\}$, or $\mathrm{max}\{\beta_{UCI\_1},\beta_{UCI\_2},\ldots,\beta_{UCI\_n}\}$.

In the description above, the UCI may include at least one of HARQ-ACK or CSI.

FIG. 7 illustrates the case where multiple PUCCHs overlap one PUSCH, and pieces of UCI included in the multiple PUCCHs have the same priority, or the pieces of UCI included in the multiple PUCCHs have different priorities, but apply the same beta offset value or the same scaling value. The case where the pieces of UCI included in the multiple PUCCHs apply different beta offset values or different scaling values is described in FIG. 8.

In the equations below, with regard to $O_{ACK}=\Sigma_{i\in U}O_{ACK}^i$, taking FIG. 7 as an example, $O_{ACK}$ denotes the size of HARQ-ACK included in the PUSCH 720, $O_{ACK}^1$ denotes HARQ-ACK information bits included in the PUCCH 718, $O_{ACK}^2$ denotes HARQ-ACK information bits included in the PUCCH 720, and U may be a set of the PUCCHs 718 and 722 overlapping the PUSCH 720, or a set of pieces of UCI included in the PUCCHs 718 and 722. Equations 2 and 3 below may be applied to the case including CSI bit information $O_{CSI}$ other than HARQ-ACK bit information $O_{ACK}$ in the corresponding PUCCH.

For HARQ-ACK transmission on PUSCH with UL-SCH, the number of coded modulation symbols per layer for HARQ-ACK transmission, denoted as $Q'_{ACK}$ determined as follows:

$$Q'_{ACK} = \min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil, \left\lceil\alpha\cdot\sum_{l=l_0}^{N_{symb,all}^{PUSCH}-1}M_{sc}^{UCI}(l)\right\rceil\right\}$$

Equation 2 where:
- $O_{ACK}=\Sigma_{i\in U}O_{ACK}^i$ is the number of HARQ-ACK bits for i-th PUCCH where U is the set of PUCCHs overlapped with the PUSCH;
- if $O_{ACK}\geq 360$, $L_{ACK}=11$; otherwise $L_{ACK}$ the number of CRC bits for HARQ-ACK determined according to Clause 6.3.1.2.1;
- $\beta_{offset}^{PUSCH}=\beta_{offset}^{HARQ-ACK}$;
- $C_{UL-SCH}$ is the number of code blocks for UL-SCH of the PUSCH transmission;
- if the DCI format scheduling the PUSCH transmission includes a CBGTI field indicating that the UE shall not transmit the r-th code block, $K^r=0$; otherwise, $K_r$ is the r-th code block size for UL-SCH of the PUSCH transmission;

$M_{sc}^{PUSCH}$ the scheduled bandwidth of the PUSCH transmission, expressed as a number of subcarriers;

$M_{sc}^{PT-RS}(i)$ is the number of subcarriers in OFDM symbol l that carries PTRS, in the PUSCH transmission;

$M_{sc}^{UCI}(l)$ is the number of resource elements that can be used for transmission of UCI in OFDM symbol l, for l=0, 1, 2, . . . $N_{symb,all}^{PUSCH}-1$, in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$;

α is configured by higher layer parameter scaling; and $l_o$ is the symbol index of the first OFDM symbol that does not carry DMRS of the PUSCH, after the first DMRS symbol(s), in the PUSCH transmission.

For HARQ-ACK transmission on PUSCH without UL-SCH, the number of coded modulation symbols per layer for HARQ-ACK transmission, denoted as $Q'_{ACK}$, is determined as follows:

Equation 3

$$Q'_{ACK} = \min\left\{\left\lceil\frac{(O_{ACK}+L_{ACK})\cdot\beta_{offset}^{PUSCH}}{R\cdot Q_m}\right\rceil, \left\lceil\alpha\cdot\sum_{l=l_0}^{N_{symb,all}^{PUSCH}-1} M_{sc}^{UCI}(l)\right\rceil\right\}$$

where:

$O_{ACK}=\Sigma_{i\in U}O_{ACK}^i$ is the number of HARQ-ACK bits for i-th PUCCH where U is the set of PUCCHs overlapped with the PUSCH;

if $O_{ACK}\geq 360$, $L_{ACK}=11$; otherwise $L_{ACK}$ is the number of CRC bits for HARQ-ACK defined according to Clause 6.3.1.2.1;

$\beta_{offset}^{PUSCH}=\beta_{offset}^{HARQ-ACK}$;

$M_{sc}^{PUSCH}$ is the scheduled bandwidth of the PUSCH transmission, expressed as a number of subcarriers;

$M_{sc}^{PT-RS}(l)$ is the number of subcarriers in OFDM symbol l that carries PTRS, in the PUSCH transmission;

$M_{sc}^{UCI}(l)$ is the number of resource elements that can be used for transmission of UCI in OFDM symbol l, for l=0, 1, 2, . . . , $N_{symb,all}^{PUSCH}-1$ in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{PT-RS}(l)$;

$l_o$ is the symbol index of the first OFDM symbol that does not carry DMRS of the PUSCH, after the first DMRS symbol(s), in the PUSCH transmission;

R is the code rate of the PUSCH, determined according to Clause 6.1.4.1 of [6, TS38.214];

$Q_m$ is the modulation order of the PUSCH; and

α is configured by higher layer parameter scaling.

Further variables are shown in Table 7 below.

TABLE 7

| |
|---|
| for any OFDM symbol that carries DMRS of the PUSCH, $M_{sc}^{UCI}(l) = 0$; |
| for any OFDM symbol that does not carry DMRS of the PUSCH, $M_{sc}^{UCI}(l) = M_{sc}^{PUSCH} - M_{sc}^{PT-RS}(l)$; |
| $l_0$ is the symbol index of the first OFDM symbol that does not carry DMRS of the PUSCH, after the first DMRS symbol(s), in the PUSCH transmission; |
| R is the code rate of the PUSCH, determined according to Clause 6.1.4.1 of [6, TS38.214]; |
| $Q_m$ is the modulation order of the PUSCH; |
| α is configured by higher layer parameter scaling. |

Alternatively, instead of Equations 2 and 3, the definition as shown in Table 8 below can be added in advance by maintaining all rate-matching-related equations without any changes from section 6.3.2.4.1 of the 3GPP TS 38.212 v16.0.0.

TABLE 8

| |
|---|
| If HARQ-ACK bits are transmitted on a PUSCH, the UCI bit sequence $a_0, a_1, a_2, a_3, \ldots, a_{A-1}$ is determined as follows: |
| If UCI is transmitted on PUSCH without UL-SCH and the UCI includes CSI part 1 without CSI part 2, |
| if there is no HARQ-ACK bit given by Clause 9.1 of [5, TS 38.213], set $a_0 = 0$, $a_1 = 0$, and $A = 2$; |
| if there is only one HARQ-ACK bit $\tilde{o}_0^{ACK}$ given by Clause 9.1 of [5, TS 38.213], set $a_0 = \tilde{o}_0^{ACK}$, $a_1 = 0$, and $A = 2$; |
| otherwise, set $a_i = \tilde{o}_i^{ACK}$ for $i = 0, 1, \ldots, O^{ACK} - 1$ and $A = O^{ACK}$, where the HARQ-ACK bit sequence $\tilde{o}_0^{ACK}, \tilde{o}_1^{ACK}, \ldots, \tilde{o}_{O^{ACK}-1}^{ACK}$ is given by Clause 9.1 of [5, TS 38.213], if UE is configured multiple-PUCCHonPUSCH, $O_{ACK} = \Sigma_{i\in U} O_{ACK}^i$ is the number of HARQ-ACK bits for i-th PUCCH where U is the set of PUCCHs overlapped with the PUSCH. |

In Table 8 above, multiple-PUCCHonPUSCH means information on a higher-layer signal, which indicates piggyback of pieces of UCI included in multiple PUCCHs on one PUSCH. Accordingly, the terminal may perform the corresponding operation when only receiving the configuration of the higher-layer signal. Alternatively, even though there is no separate higher-layer signal configuration received, the terminal may perform the operation when reporting the corresponding capability to the base station.

Alternatively, according to at least one the following schemes, the terminal may not support the operation, as shown in FIG. 7, of piggyback of multiple PUCCHs including HARQ-ACK information, on one PUSCH. That is, the schemes below support only to multiplex a single PUCCH including HARQ-ACK or CSI information to one PUSCH.

Scheme 2-1: The terminal does not expect to receive scheduling in which the same type of UCI included in PUCCHs transmitted in different sub-slots is multiplexed to a PUSCH transmitted in one slot. When the scheduling is performed by the base station, the terminal considers the same as an error case. Accordingly, as described above with reference to FIG. 7, the base station is not allowed to perform the scheduling in which the pieces of HARQ-ACK information included in the PUCCHs 718 and 722 transmitted in different sub-slots are multiplexed to the PUSCH 720 transmitted in one slot.

Scheme 2-2: When the terminal is configured with a higher-layer signal for a sub-slot, the terminal does not expect to receive scheduling of a PUSCH over multiple sub-slots. When the base station performs the scheduling, the terminal considers the same as an error case. For example, when the base station configures a sub-slot in advance via a higher-layer and configures the sub-slot to have the length of seven symbols, the base station needs to perform the PUSCH scheduling only within the corresponding sub-slot.

Scheme 2-3: When PUCCHs transmitted in different sub-slots overlap a PUSCH scheduled in one slot, the terminal considers that only UCI included in one PUCCH is multiplexed to the corresponding PUSCH. That is, when the multiple PUCCHs overlap the scheduled PUSCH, the terminal allows only the UCI included in one PUCCH to piggyback on the corresponding PUSCH, and drops the other pieces of UCI included in the remaining PUCCHs. The base station and the terminal may follow at least one of the following schemes as a scheme of determining a PUCCH including UCI to be included in a PUSCH, among multiple PUCCHs overlapping the PUSCH.

Specific scheme 2-3-1: The base station and the terminal determine a PUCCH including a start symbol of the PUCCH, which comes first, from among PUCCHs overlapping a PUSCH. When two or more selected PUCCHs exist, the base station and the terminal determine a PUCCH including an end symbol which comes first.

Specific scheme 2-3-2: The base station and the terminal determines a PUCCH including an end symbol of the PUCCH, which comes first, from among PUCCHs overlapping a PUSCH. When two or more selected PUCCHs exist, the base station and the terminal determine a PUCCH including a start symbol which comes first.

Specific scheme 2-3-3: The base station and the terminal determine a PUCCH having the highest PUCCH priority, from among PUCCHs overlapping a PUSCH.

The PUCCH priority may be determined by a DCI format for scheduling the corresponding PUCCH, or may be determined by a field in the DCI format. Having the high priority means that a value of the corresponding priority may be the smallest value or the greatest value.

Figure 8:
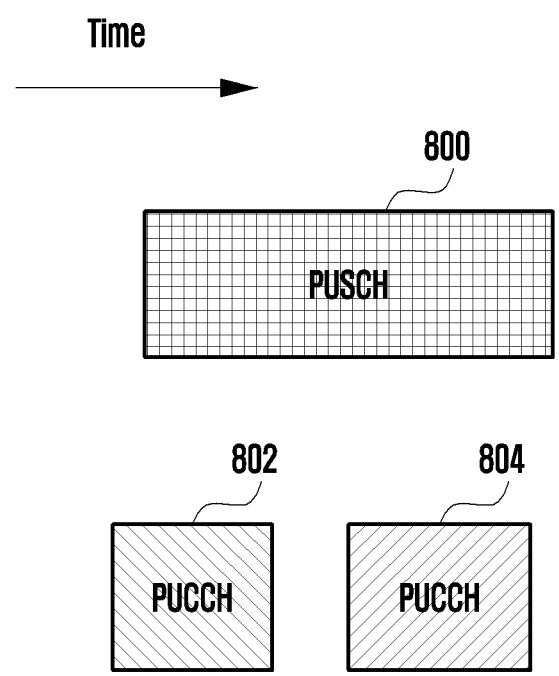
FIG. 8 illustrates a case in which a PUCCH and a PUSCH are scheduled in the same time resource according to an embodiment of the disclosure.

FIG. 8 illustrates a case in which a PUCCH and a PUSCH are scheduled in the same time resource according to an embodiment of the disclosure.

Referring to FIG. 8, it is assumed that one PUSCH 800 is scheduled to overlap two different PUCCHs 802 and 804 in the time resource, and pieces of UCI included in the two PUCCHs have different priorities. Pieces of DCI (or DCI formats) for scheduling the PUSCH may have the same or different priority as or form one piece of DCI (or one of DCI formats) for scheduling at least two PUCCHs. The priority information may be indicated through a field in the DCI, or the DCI format itself may include (or indicate) the priority information. For example, the PUSCH 800 may be scheduled to include eMBB data information, the PUCCH 802 may include UCI for eMBB, and the PUCCH 804 may include UCI for URLLC. The UCI may include HARQ-ACK, CSI, or SR information. In addition, the PUCCHs and the PUSCH may be a grant-free resource (or a configured grant resource) which allows periodical transmission or reception without DCI transmission or reception. In this case, the priorities are determined in advance via a higher-layer signal or an L1 signal.

When pieces of UCI having different requirements (reliability and latency) simultaneously piggyback on one PUSCH, the pieces of UCI may have different rate-matching values from each other. Specifically, when pieces of UCI piggyback on the PUSCH, different beta offset β values may be applied. The beta offset value is a value for determining the resource amount of the UCI piggybacking on the PUSCH, and is a value for adaptively adjusting the transmission reliability of the UCI included in the PUSCH. The beta offset value is included in the DCI field and dynamically indicated, or when there is no DCI field, the beta offset value may be a fixed value configured via higher-layer signaling. Table 9 below shows an example of candidate values of the beta offset for HARQ-ACK $\beta_{offset}^{HARQ-ACK}$ and higher-layer index information used to indicate the candidate values $I_{offset,0}^{HARQ-ACK}$, $I_{offset,1}^{HARQ-ACK}$, or $I_{offset,2}^{HARQ-ACK}$. The configuration of a beta offset value for CSI is similar to the configuration shown in Table 9, and different values may be applied when compared with the case of HARQ-ACK.

TABLE 9

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |

TABLE 9-continued

| $I_{offset, 0}^{HARQ\text{-}ACK}$ or $I_{offset, 1}^{HARQ\text{-}ACK}$ or $I_{offset, 2}^{HARQ\text{-}ACK}$ | $\beta_{offset}^{HARQ\text{-}ACK}$ |
|---|---|
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

The beta offset values above may be applied to Equation 4 below.

For HARQ-ACK transmission on PUSCH with UL-SCH, the number of coded modulation symbols per layer for HARQ-ACK transmission, denoted $Q'_{ACK}$, is determined as follows:

$$Q'_{ACK} = \min\left\{\left\lceil\frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r}\right\rceil, \left\lceil \alpha \cdot \sum_{l=l_0}^{N_{symb,all}^{PUSCH}-1} M_{sc}^{UCI}(l) \right\rceil\right\}$$

Equation 4 where:

$O_{ACK}$ is the number of HARQ-ACK bits;

if $O_{ACK} \geq 360$, $L_{ACK} = 11$; otherwise $L_{ACK}$ is the number of CRC bits for HARQ-ACK determined according to Clause 6.3.1.2.1;

$\beta_{offset}^{PUSCH} = \beta_{offset}^{HARQ\text{-}ACK}$;

$C_{UL\text{-}SCH}$ is the number of code blocks for UL-SCH of the PUSCH transmission;

if the DCI format scheduling the PUSCH transmission includes a CBGTI field indicating that the UE shall not transmit the r-th code block, $K_r = 0$; otherwise, $K_r$ is the r-th code block size for UL-SCH of the PUSCH transmission;

$M_{sc}^{PUSCH}$ is the scheduled bandwidth of the PUSCH transmission, expressed as a number of subcarriers;

$M_{sc}^{PT\text{-}RS}(l)$ is the number of subcarriers in OFDM symbol l that carries PTRS, in the PUSCH transmission;

$M_{sc}^{UCI}(l)$ is the number of resource elements that can be used for transmission of UCI in OFDM symbol l, for l=0, 1, 2, . . . , $N_{symb,all}^{PUSCH}-1$, in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l) = 0$;

for any OFDM symbol that does not carry DMRS of the PUSCH, $M_{sc}^{UCI}(l) = M_{sc}^{PUSCH} - M_{sc}^{PT\text{-}RS}(l)$;

α is configured by higher layer parameter scaling; and $l_0$ is the symbol index of the first OFDM symbol that does not carry DMRS of the PUSCH, after the first DMRS symbol(s), in the PUSCH transmission.

For HARQ-ACK transmission on PUSCH without UL-SCH, the number of coded modulation symbols per layer for HARQ-ACK transmission, denoted as $Q'_{ACK}$, is determined as follows:

$$Q'_{ACK} = \min\left\{\left\lceil\frac{(O_{ACK} + L_{ACK}) \cdot \beta_{offset}^{PUSCH}}{R \cdot Q_m}\right\rceil, \left\lceil \alpha \cdot \sum_{l=l_0}^{N_{symb,all}^{PUSCH}-1} M_{sc}^{UCI}(l) \right\rceil\right\}$$

Equation 5 where:

$O_{ACK}$ is the number of HARQ-ACK bits;

if $O_{ACK} \geq 360$, $L_{ACK} = 11$; otherwise $L_{ACK}$ is the number of CRC bits for HARQ-ACK defined according to Clause 6.3.1.2.1;

$\beta_{offset}^{PUSCH} = \beta_{offset}^{HARQ\text{-}ACK}$;

$M_{sc}^{PUSCH}$ is the scheduled bandwidth of the PUSCH transmission, expressed as a number of subcarriers;

$M_{sc}^{PT\text{-}RS}(l)$ is the number of subcarriers in OFDM symbol that carries PTRS, in the PUSCH transmission;

$M_{sc}^{UCI}(l)$ is the number of resource elements that can be used for transmission of UCI in OFDM symbol l, for l=0, 1, 2, . . . , $N_{symb,all}^{PUSCH}-1$, in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l) = 0$;

for any OFDM symbol that does not carry DMRS of the PUSCH, $M_{sc}^{UCI}(l) = M_{sc}^{PUSCH} - M_{sc}^{PT\text{-}RS}(l)$;

$l_o$ is the symbol index of the first OFDM symbol that does not carry DMRS of the PUSCH, after the first DMRS symbol(s), in the PUSCH transmission;

R is the code rate of the PUSCH, determined according to Clause 6.1.4.1 of [6, TS38.214];

$Q_m$ is the modulation order of the PUSCH; and

α is configured by higher layer parameter scaling.

In Equations 4-5 above, $O_{ACK}$ and $O'_{ACK}$ may be replaced with CSI part 1 and CSI part 2 other than HARQ-ACK information and applied. As described above with reference to FIG. 8, when the same type of UCI has different priorities and piggybacks on one PUSCH, different beta offset values may be applied.

Figure 9:
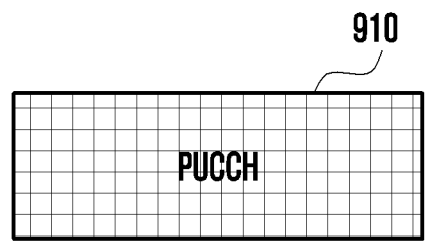
FIG. 9 illustrates a case in which different PUCCHs are scheduled in the same time resource according to an embodiment of the disclosure.
Figure 9:
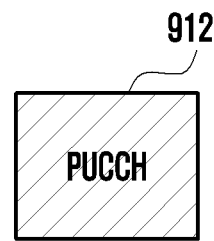

In this case, similar to the case shown in FIG. 9, multiple beta offset values may be configured through a scheme of configuring two beta offset values for each beta offset indicator value in advance. For example, when a beta offset indicator field included in a particular piece of DCI is '00', and multiple PUCCHs having different priority values are multiplexed to the corresponding PUSCH scheduled by the particular piece of DCI, the terminal determines the resource amount by which the corresponding UCI piggybacks on the PUSCH by applying the beta offset value corresponding to each priority. When the PUCCH including only one priority value piggybacks on the corresponding PUSCH, only the beta offset value of the corresponding priority value is applied. Table 10 below shows an example of the case in which the size of a bit field indicating the beta offset is 2 bits. When the size of the bit field is 1 bit, only the first two values ('00' and '01') are applied, and when the size of the bit field is 0 bit (configured via higher-layer signaling), only the first value ('00') is applied or a value configured via higher-layer signaling is applied. Table 10 below shows an example that the beta offset field of the DCI indicates two beta offset values, but this may be extended to the case of indicating three or more beta offset values. In this case, the priority value included in the DCI may be also extended together with the beta offset value.

TABLE 10

| beta_offset indicator | $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ for priority value of 0 | $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ for priority value of 1 |
|---|---|---|
| '00' | 1$^{st}$ offset index provided by higher layers | 2$^{nd}$ offset index provided by higher layers |
| '01' | 3$^{rd}$ offset index provided by higher layers | 4$^{th}$ offset index provided by higher layers |
| '10' | 5$^{th}$ offset index provided by higher layers | 6$^{th}$ offset index provided by higher layers |
| '11' | 7$^{th}$ offset index provided by higher layers | 8$^{th}$ offset index provided by higher layers |

When the same type of UCI having different priorities piggybacks on one PUSCH, in addition to applying different beta offset values, different alpha α (scaling) values may be applied in Equation 6 below. When the different values are applied, alpha values according to priority values may be separately configured in advance. In this case, the Q' value may be determined based on the sum of values of, $$\left\lceil \alpha \cdot \sum_{l=l_0}^{N_{symb,all}^{PUSCH}-1} M_{sc}^{UCI}(l) \right\rceil \quad \text{Equation 6}$$

for UCI to be transmitted on each of PUCCHs, and an α value corresponding to each piece of UCI may be applied.

The case of determining the number Q' of resources including UCI rate-matched to a PUCSH when pieces of UCI of PUCCHs piggyback on the PUSCH is described above. However, there is a need to determine the resource size for PUCCH transmission of the terminal when multiple PUCCHs are multiplexed in the case in which the PUCCHs overlap in the time resource and pieces of UCI of the PUCCHs have different priorities. Accordingly, a scheme of determining the size of a resource for PUCCH transmission or a PUCCH resource is described below.

FIG. 9 illustrates a case in which different PUCCHs are scheduled in the same time resource according to an embodiment of the disclosure.

Referring to FIG. 9, two different PUCCHs 910 and 912 overlap and perform scheduling without PUSCH scheduling. In this case, the terminal includes UCI included in different PUCCHs in one PUCCH and transmits the same, and a PUCCH resource is determined among resources configured in advance via a higher-layer signal through the UCI size and a PUCCH resource assignment field included in the last DCI format which performed scheduling for determining the corresponding PUCCH. In the case where the two PUCCHs 910 and 912 have the same type of UCI, or have different types of UCI and the same priority information, when the RB size M is determined for PUCCH resource determination or for PUCCH transmission as shown in Equation 5 below, only one maxCodeRate value r is considered. However, when the UCI types having different priorities is multiplexed in one PUCCH, the terminal needs to apply different maxCodeRate values so that each piece of UCI has different reliability values.

When all pieces of UCI included in the PUCCH have the same priority values at the time of PUCCH transmission, O, N, $M_{sc}$, Q, and r are considered to determine a resource block size M used for the PUCCH transmission. O denotes a bit size including the UCI size and the CRC size multiplexed to one PUCCH, N denotes the number of subcarriers for each resource block, Q denotes a modulation order, and r denotes a code rate. The parameters may be determined in advance via a higher-layer signal, an L1 signal, or a combination thereof. For example, the terminal selects the smallest value of M satisfying $O \leq M \cdot N \cdot M_{sc} \cdot Q \cdot r$ and transmits the PUCCH. The UCI may be HARQ-ACK, SR, CSI, or some combination thereof. The detailed description will be made with reference to Equation 7 below.

In addition, a scheme of selecting a PUCCH resource through which the UCI is transmitted generally follows Equation 7 below. The detailed description will be made with reference to below. If, $$(RE)_j \cdot Q \cdot r < O \leq (RE)_{j+1} \cdot Q \cdot r \quad \text{Equation 7}$$

where $(RE)_j$ is total number of resource elements of j-th PUCCH resource, Q is modulation order, is max code rate, O is total number of UCIs including CRC bits, j+1-th PUCCH resource is used, then:

$O_{ACK}$ a total number of HARQ-ACK information bits, if any; and $O_{SR}$ a total number of SR bits and $O_{SR}=0$ if there is no scheduling request bit, otherwise, $O_{SR}=\lceil \log_2(K+1) \rceil$ as described in Clause 9.2.5.1.

Further, $$O_{CSI} = \sum_{n=1}^{N_{CSI}^{total}} (O_{CSI-part1,n} + O_{CSI-part2,n}), \quad \text{Equation 8}$$

where $O_{CSI-part1,n}$ is a number of Part 1 CSI report bits for CSI report with priority value n, $O_{CSI-part2,n}$ is a number of Part 2 CSI report bits, if any, for CSI report with priority value n [6, TS 38.214], and $N_{CSI}^{total}$ is a number of CSI reports that include overlapping CSI reports.

Further, $$O_{CRC}=O_{CRC,CSI-part1}+O_{CRC,CSI-part2}, \quad \text{Equation 9}$$

where $O_{CRC,CSI-part1}$ is a number of CRC bits, if any, for encoding HARQ-ACK, SR and Part 1 CSI report bits and $O_{CRC,CSI-part2}$ is a number of CRC bits, if any, for encoding Part 2 CSI report bits.

In the following:
r is a code rate given by maxCodeRate as in Table 9.2.5.2-1;
$M_{RB}^{PUCCH}$ is a number of PRBs for PUCCH format 2, or PUCCH format 3, or PUCCH format 4, respectively, where $M_{RB}^{PUCCH}$ is provided by nrofPRBs in PUCCH-format2 for PUCCH format 2 or by nrofPRBs in PUCCH-format3 for PUCCH format 3, and PUCCH $M_{RB}^{PUCCH}=1$ for PUCCH format 4;
$N_{sc,ctrl}^{RB}=N_{sc}^{RB}-4$ for PUCCH format 2 or, if the PUCCH resource with PUCCH format 2 includes an orthogonal cover code with length $N_{SF}^{PUCCH,2}$ provided by OCC- Length-r16, $N_{sc,ctrl}^{RB}=(N_{sc}^{RB}-4)/N_{SF}^{PUCCH,2}$, $N_{sc,ctrl}^{RB}=N_{sc}^{RB}$ for PUCCH format 3 or, if the PUCCH resource with PUCCH format 3 includes an orthogonal cover code with length $N_{SF}^{PUCCH,3}$ provided by OCC-Length-r16, $N_{sc,ctrl}^{RB}=N_{sc}^{RB}/N_{SF}^{PUCCH,3}$, and $N_{sc,ctrl}^{RB}=N_{sc}^{RB}/N_{SF}^{PUCCH,4}$ for PUCCH format 4, where $N_{sc}^{RB}$ is a number of subcarriers per resource block [4, TS 38.211];

$N_{symb-UCI}^{PUCCH}$ is equal to a number of PUCCH symbols $N_{symb}^{PUCCH,2}$ for PUCCH format 2 provided by nrofSymbols in PUCCH-format2. For PUCCH format 3 or for PUCCH format 4, $N_{symb-UCI}^{PUCCH}$ is equal to a number of PUCCH symbols $N_{symb}^{PUCCH,3}$ for PUCCH format 3 or equal to a number of PUCCH symbols $N_{symb}^{PUCCH,4}$ for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively [4, TS 38.211]; and $Q_m=1$ if pi/2-BPSK is the modulation scheme and $Q_m=2$ if QPSK is the modulation scheme as indicated by pi2BPSK for PUCCH format 3 or PUCCH format 4. For PUCCH format 2, $Q_m=2$.

If a UE transmits a PUCCH with $O_{ACK}$ HARQ-ACK information bits, $O_{SR}=\lceil \log_2(K+1) \rceil$ SR bits, and $O_{CRC}$ CRC bits using PUCCH format 2 or PUCCH format 3 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is smaller than or equal to a number of PRBs provided respectively by nrofPRBs in PUCCH-format2 or nrofPRBs in PUCCH-format3 and starts from the first PRB from the number of PRBs, that results to $(O_{ACK}+O_{SR}+O_{CRC}) \leq M_{RB,min}^{PUCCH} \cdot N_{sc,ctrl}^{RB} \cdot N_{symb-UCI}^{PUCCH} \cdot Q_m \cdot r$ and, if $M_{RB}^{PUCCH}>1$, $(O_{ACK}+O_{SR}+O_{CRC})>(M_{RB,min}^{PUCCH}-1) \cdot N_{sc,ctrl}^{RB} \cdot N_{symb-UCI}^{PUCCH} \cdot Q_m \cdot r$, where $N_{sc,ctrl}^{RB}$, $N_{symb-UCI}^{PUCCH}$, $Q_m$, and r are defined in Clause 9.2.5.2. For PUCCH format 3, if $M_{RB,min}^{PUCCH}$ is not equal $2^{\alpha_2} \cdot 3^{\alpha_3} \cdot 5^{\alpha_5}$ according to [4, TS 38.211], $M_{RB,min}^{PUCCH}$ is increased to the nearest allowed value of nrofPRBs for PUCCH-format3 [12, TS 38.331]. If $(O_{ACK}+O_{SR}+O_{CRC})>(M_{RB}^{PUCCH}-1) \cdot N_{sc,ctrl}^{RB} \cdot N_{symb-UCI}^{PUCCH} \cdot Q_m \cdot r$, the UE transmits the PUCCH over the $M_{RB}^{PUCCH}$ PRBs.

If a UE is provided a first interlace of $M_{Interlace,0}^{PUCCH}$ PRBs by interlace0 in InterlaceAllocation-r16 and transmits a PUCCH with $O_{ACK}$ HARQ-ACK information bits, $O_{SR}=\lceil \log_2(K+1) \rceil$ SR bits, and $O_{CRC}$ CRC bits using PUCCH format 2 or PUCCH format 3, the UE transmits the PUCCH over the first interlace if $(O_{ACK}+O_{SR}+O_{CRC}) \leq M_{Interlace,0}^{PUCCH} \cdot N_{sc,ctrl}^{RB} \cdot N_{symb-UCI}^{PUCCH} \cdot Q_m \cdot r$; otherwise, if the UE is provided a second interlace by interlace1 in PUCCH-format2 or PUCCH-format3, the UE transmits the PUCCH over the first and second interlaces.

If a UE has one or more CSI reports and zero or more HARQ-ACK/SR information bits to transmit in a PUCCH where the HARQ-ACK, if any, is in response to a PDSCH reception without a corresponding PDCCH:

if any of the CSI reports are overlapping and the UE is provided by multi-CSI-PUCCH-ResourceList with J≤2 PUCCH resources in a slot, for PUCCH format 2 and/or PUCCH format 3 and/or PUCCH format 4, as described in Clause 9.2.1, where the resources are indexed according to an ascending order for the product of a number of corresponding REs, modulation order $Q_m$, and configured code rate r;

if $(O_{ACK}+O_{SR}+O_{CSI}+O_{CRC}) \leq (M_{RB}^{PUCCH} \cdot N_{sc,ctrl}^{RB} \cdot N_{symb-UCI}^{PUCCH} \cdot Q_m \cdot r)_0$, the UE uses PUCCH format 2 resource 0, or the PUCCH format 3 resource 0, or the PUCCH format 4 resource 0;

else if $(O_{ACK}+O_{SR}+O_{CSI}+O_{CRC}) \leq (M_{RB}^{PUCCH} \cdot N_{sc,ctrl}^{RB} \cdot N_{symb-UCI}^{PUCCH} \cdot Q_m \cdot r)_j$ and $(O_{ACK}+O_{SR}+O_{CSI}+O_{CRC}) \leq (M_{RB}^{PUCCH} \cdot N_{sc,ctrl}^{RB} \cdot N_{symb-UCI}^{PUCCH} \cdot Q_m \cdot r)_{j+1}$, $0 \leq j < J-1$, the UE transmits a PUCCH conveying HARQ-ACK information, SR and CSI report(s) in a respective PUCCH where the UE uses the PUCCH format 2 resource j+1, or the PUCCH format 3 resource j+1, or the PUCCH format 4 resource j+1 else the UE uses the PUCCH format 2 resource J−1, or the PUCCH format 3 resource J−1, or the PUCCH format 4 resource J−1 and the UE selects $N_{CSI}^{reported}$ CSI report(s) for transmission together with HARQ-ACK information and SR, when any, in ascending priority value as described in [6, TS 38.214]; and else, the UE transmits the $O_{ACK}+O_{SR}+O_{CSI}+O_{CRC}$ bits in a PUCCH resource provided by pucch-CSI-ResourceList and determined as described in Clause 9.2.5.

If a UE has HARQ-ACK, SR and wideband or sub-band CSI reports to transmit and the UE determines a PUCCH resource with PUCCH format 2, or the UE has HARQ-ACK, SR and wideband CSI reports [6, TS 38.214] to transmit and the UE determines a PUCCH resource with PUCCH format 3 or PUCCH format 4, where:

the UE determines the PUCCH resource using the PUCCH resource indicator field [5, TS 38.212] in a last of a number of DCI formats with a value of a PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, from a PUCCH resource set provided to the UE for HARQ-ACK transmission, the UE determines the PUCCH resource set as described in Clause 9.2.1 and Clause 9.2.3 for $O_{UCI}$ UCI bits, and:

if $(O_{ACK}+O_{SR}+O_{CSI-part1}+O_{CRC,CSI-part1}) \leq M_{RB}^{PUCCH} \cdot N_{sc,ctrl}^{RB} \cdot N_{symb-UCI}^{PUCCH} \cdot Q_m \cdot r$, the UE transmits the HARQ-ACK, SR, and CSI reports bits by selecting the minimum number $M_{RB,min}^{PUCCH}$ of the $M_{RB}^{PUCCH}$ PRBs satisfying $(O_{ACK}+O_{SR}+O_{CSI-part1}+O_{CRC,CSI-part1}) \leq M_{RB,min}^{PUCCH} \cdot N_{sc,ctrl}^{RB} \cdot N_{symb-UCI}^{PUCCH} \cdot Q_m \cdot r$ as described in Clauses 9.2.3 and 9.2.5.1; and else, the UE selects $N_{CSI}^{reported}$ CSI report(s), from the $N_{CSI}^{total}$ CSI reports, for transmission together with HARQ-ACK and SR in ascending priority value [6, TS 38.214], where the value of $N_{CSI}^{reported}$ satisfies $$\left( O_{ACK} + O_{SR} + \sum_{n=1}^{N_{CSI}^{reported}} O_{CSI-part1,n} + O_{CRC,CSI-part1,N} \right) \leq$$

$$M_{RB}^{PUCCH} \cdot N_{sc,ctrl}^{RB} \cdot N_{symb-UCI}^{PUCCH} \cdot Q_m \cdot r \text{ and}$$

$$\left( O_{ACK} + O_{SR} + \sum_{n=1}^{N_{CSI}^{reported}+1} O_{CSI-part1,n} + O_{CRC,CSI-part1,N+1} \right) >$$

$$M_{RB}^{PUCCH} \cdot N_{sc,ctrl}^{RB} \cdot N_{symb-UCI}^{PUCCH} \cdot Q_m \cdot r,$$

where $O_{CRC,CSI-part1,N}$ is a number of CRC bits corresponding to $$O_{ACK} + O_{SR} + \sum_{n=1}^{N_{CSI}^{reported}} O_{CSI-part1,n}$$

UCI bits, and $O_{CRC,CSI-part1,N+1}$ is a number of CRC bits corresponding to $$O_{ACK} + O_{SR} + \sum_{n=1}^{N_{CSI}^{reported}+1} O_{CSI-part1,n}$$

UCI bits.

If a UE is provided a first interlace of $M_{interlace,0}^{PUCCH}$ PRBs by interlace0 in InterlaceAllocation-r16, the UE has HARQ-ACK, SR and wideband or sub-band CSI reports to transmit, and the UE determines a PUCCH resource with PUCCH format 2, or the UE has HARQ-ACK, SR and wideband CSI reports to transmit and the UE determines a PUCCH resource with PUCCH format 3, where:

the UE determines the PUCCH resource using the PUCCH resource indicator field in a last of a number of DCI formats with a value of a PDSCH-to-HARQ feedback timing indicator field indicating a same slot for the PUCCH transmission, from a PUCCH resource set provided to the UE for HARQ-ACK transmission, the UE determines the PUCCH resource set as described in Clauses 9.2.1 and 9.2.3 for $O_{UCI}$ UCI bits, and:

if $(O_{ACK}+O_{SR}+O_{CSI-part1}+O_{CRC,CSI-part1}) \leq M_{Interlace,0}^{PUCCH} \cdot N_{sc,ctrl}^{RB} \cdot N_{symb-UCI}^{PUCCH} \cdot Q_m \cdot r$, the UE transmits the HARQ-ACK, SR, and CSI reports bits in a PUCCH over the first interlace;

else, if the UE is provided a second interlace of $M_{Interlace,1}^{PUCCH}$ PRBs by interlace1 in PUCCH-format2 or PUCCH-format3 and if $(O_{ACK}+O_{SR}+O_{CSI-part1}+O_{CRC,CSI-part1}) \leq (M_{Interlace,0}^{PUCCH}+M_{Interlace,1}^{PUCCH}) \cdot N_{sc,ctrl}^{RB} \cdot N_{symb-UCI}^{PUCCH} \cdot Q_m \cdot r$, the UE transmits the HARQ-ACK, SR, and CSI reports bits in a PUCCH over both the first and second interlaces; and else, the procedure is same as the corresponding one when the UE is provided PUCCH-ResourceSet by replacing $M_{RB}^{PUCCH}$ with $M_{Interlace,0}^{PUCCH}$, or, if the UE is provided interlace1, by $M_{Interlace,0}^{PUCCH}+M_{Interlace,1}^{PUCCH}$.

If a UE has HARQ-ACK, SR and sub-band CSI reports to transmit and the UE determines a PUCCH resource with PUCCH format 3 or PUCCH format 4, where:

the UE determines the PUCCH resource using the PUCCH resource indicator field [5, TS 38.212] in a last of a number of DCI formats with a value of a PDSCH-to-HARQ_feedback timing indicator field indicating a same slot for the PUCCH transmission, from a PUCCH resource set provided to the UE for HARQ-ACK transmission, the UE determines the PUCCH resource set as described in Clause 9.2.1 and Clause 9.2.3 for $O_{UCI}$ UCI bits, and:

if $(O_{ACK}+O_{SR}+O_{CSI}+O_{CRC}) \leq M_{PB}^{PUCCH} \cdot N_{sc,ctrl}^{RB} \cdot N_{symb-UCI}^{PUCCH} \cdot Q_m \cdot r$, the UE transmits the HARQ-ACK, SR and the $N_{CSI}^{total}$ CSI report bits by selecting the minimum number $M_{RB,min}^{PUCCH}$ of PRBs from the $M_{RB}^{PUCCH}$ PRBs satisfying $(O_{ACK}+O_{SR}+O_{CSI}+O_{CRC}) \leq M_{RB,min}^{PUCCH} \cdot N_{sc,ctrl}^{RB} \cdot N_{symb-UCI}^{PUCCH}$.

$Q_m \cdot r$ as described in Clauses 9.2.3 and 9.2.5.1;

else, if for $N_{CSI-part2}^{reported} > 0$ Part 2 CSI report priority value(s), it is, $$\sum_{n=1}^{N_{CSI-part2}^{reported}} O_{CSI-part2,n} + O_{CRC,CSI-part2,N} \leq \left( M_{RB}^{PUCCH} \cdot N_{sc,ctrl}^{RB} \cdot N_{symb-UCI}^{PUCCH} - \left[ \left( O_{ACK} + O_{SR} + \sum_{n=1}^{N_{CSI}^{total}} O_{CSI-part1,n} + O_{CRC,CSI-part1} \right) / (Q_m \cdot r) \right] \right) \cdot Q_m \cdot r \text{ and}$$

$$\sum_{n=1}^{N_{CSI-part2}^{reported}+1} O_{CSI-part2,n} + O_{CRC,CSI-part2,N+1} > \left( M_{RB}^{PUCCH} \cdot N_{sc,ctrl}^{RB} \cdot N_{symb-UCI}^{PUCCH} - \left[ \left( O_{ACK} + O_{SR} + \sum_{n=1}^{N_{CSI}^{total}} O_{CSI-part1,n} + O_{CRC,CSI-part1} \right) / (Q_m \cdot r) \right] \right) \cdot Q_m \cdot r;$$

the UE selects the first $N_{CSI-part2}^{reported}$ Part 2 CSI reports, according to respective priority value(s) [6, TS 38.214], for transmission together with the HARQ-ACK, SR and $N_{CSI}^{total}$ Part 1 CSI reports, where $O_{CSI-part,n}$ is the number of Part 1 CSI report bits for the $n_{th}$ CSI report and $O_{CSI-part2,n}$ is the number of Part 2 CSI report bits for the $n_{th}$ CSI report priority value, $O_{CRC,CSI-part2,N}$ is a number of CRC bits corresponding to $$\sum_{n=1}^{N_{CSI-part2}^{reported}} O_{CSI-part2,n},$$

and $O_{CRC,CSI-part2,N+1}$ is a number of CRC bits corresponding to $$\sum_{n=1}^{N_{CSI-part2}^{reported}+1} O_{CSI-part2,n};$$

and else, the UE drops all Part 2 CSI reports and selects $N_{CSI-part1}^{reported}$ Part 1 CSI report(s), from the $N_{CSI}^{total}$ CSI reports in ascending priority value [6, TS 38.214], for transmission together with the HARQ-ACK and SR information bits where the value of $N_{CSI-part1}^{reported}$ satisfies $$\left( O_{ACK} + O_{SR} + \sum_{n=1}^{N_{CSI-part1}^{reported}} O_{CSI-part1,n} + O_{CRC,CSI-part1,N} \right) \leq$$

$$M_{RB}^{PUCCH} \cdot N_{sc,ctrl}^{RB} \cdot N_{symb-UCI}^{PUCCH} \cdot Q_m \cdot r \text{ and}$$

$$\left( O_{ACK} + O_{SR} + \sum_{n=1}^{N_{CSI-part1}^{reported}+1} O_{CSI-part1,n} + O_{CRC,CSI-part1,N+1} \right) >$$

$$M_{RB}^{PUCCH} \cdot N_{sc,ctrl}^{RB} \cdot N_{symb-UCI}^{PUCCH} \cdot Q_m \cdot r,$$

where $O_{CRC,CSI-part1,N}$ is a number of CRC bits corresponding to $$O_{ACK} + O_{SR} + \sum_{n=1}^{N_{CSI-part1}^{reported}} O_{CSI-part1,n}$$

UCI bits, and $O_{CRC,CSI-part1,N+1}$ is a number of CRC bits corresponding to $$O_{ACK} + O_{SR} + \sum_{n=1}^{N_{CSI-part1}^{reported}+1} O_{CSI-part1,n}$$

UCI bits.

If a UE is provided a first interlace of $M_{Interlace,0}^{PUCCH}$ PRBs by interlace0 in InterlaceAllocation-r16, the UE has HARQ-ACK, SR and sub-band CSI reports to transmit, and the UE determines a PUCCH resource with PUCCH format 3, where:

the UE determines the PUCCH resource using the PUCCH resource indicator field in a last of a number of DCI formats that have a value of a PDSCH-to-HARQ_feedback timing indicator field indicating a same slot for the PUCCH transmission, from a PUCCH resource set provided to the UE for HARQ-ACK transmission, the UE determines the PUCCH resource set as described in Clauses 9.2.1 and 9.2.3 for $O_{UCI}$ UCI bits, and:

if $(O_{ACK}+O_{SR}+O_{CSI}+O_{CRC}) \leq M_{Interlace,0}^{PUCCH} \cdot N_{sc,ctrl}^{RB} \cdot N_{symb-UCI}^{PUCCH} \cdot Q_m \cdot r$, the UE transmits the HARQ-ACK, SR and the $N_{CSI}^{total}$ CSI report bits in a PUCCH over the first interlace;

else if the UE is provided a second interlace of $M_{Interlace,1}^{PUCCH}$ PRBs by interlace 1 in PUCCH-format3 and if $(O_{ACK}+O_{SR}+O_{CSI}+O_{CRC}) \leq (M_{Interlace,0}^{PUCCH}+M_{Interlace,1}^{PUCCH}) \cdot N_{sc,ctrl}^{RB} \cdot N_{symb-UCI}^{PUCCH} \cdot Q_m \cdot r$, the UE transmits the HARQ-ACK, SR, and CSI reports bits in a PUCCH over both the first and second interlaces; and else, the procedure is same as the corresponding one when the UE is provided PUCCH-ResourceSet by replacing $M_{RB}^{PUCCH}$ with $M_{Interlace,0}^{PUCCH}$, or, if the UE is provided interlace1, with $M_{Interlace,0}^{PUCCH}+M_{Interlace,1}^{PUCCH}$.

Table 11 illustrates Code rate r corresponding to value of maxCodeRate.

TABLE 11

| maxCodeRate | Code rate r |
| --- | --- |
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | Reserved |

When pieces of UCI multiplexed to one PUCCH have different priorities, the terminal considers $O_1$, $O_2$, $O_{CRC}$, N, $M_{sc}$, Q, $r_1$, and $r_2$ to determine the resource size for PUCCH transmission. $O_1$ denotes the size of UCI which has a value of priority information 1 and is multiplexed to one PUCCH, $O_2$ denotes the size of UCI which has a value of priority information 2 and is multiplexed to one PUCCH, and $O_{CRC}$ may be the size of CRC determined in consideration of both $O_1$ and $O_2$, or the size of the sum of CRC determined in consideration of $O_1$ and CRC determined in consideration of $O_2$. Further, N denotes the number of subcarriers for each resource block, Q denotes a modulation order, $R_1$ denotes the max code rate corresponding to priority 1, and $R_2$ denotes the max code rate corresponding to priority 2. An example of services corresponding to priority 1 and 2 may be URLLC and eMBB, respectively, but is not limited thereto. The parameters may be determined in advance via a higher-layer signal, an L1 signal, or a combination thereof. In this case, to determine the value of M, the value of r corresponding to each priority may be applied to UCI (or the bit number of the UCI) corresponding to each piece of priority information. For example, the terminal transmits the PUCCH by selecting the smallest value of M satisfying $$\frac{O_1}{r_2} + \frac{O_2}{r_2} \leq M \cdot N \cdot M_{SC} \cdot Q,$$

and in the inequation, one or both of $O_1$ and $O_2$ may include $O_{CRC}$ bit size. Furthermore, pieces of UCI relating to priority 1 and priority 2 may be the same type of UCI (HARQ-ACK, SR, or CSI) or different types of UCI.

When UCI having different pieces of priority information is included in one PUCCH, in order to determine a PUCCH resource, the value of r corresponding to each priority may be applied to UCI (or the bit number of the UCI) corresponding to each piece of priority information. For example, instead of Equation 6, Equation 10 below may be applied. If, $$(RE)_j \cdot Q < \frac{O_0}{r_0} + \frac{O_1}{r_1} \leq (RE)_{j+1} \cdot Q \qquad \text{Equation 10}$$

where $(RE)_j$ is total number of resource elements of j-th PUCCH resource, Q is modulation order, is max code rate for UCI with priority value of 0, is max code rate for UCI with priority value of 1, O0 is total number of UCIs including CRC bits with priority value of 0, O1 is total number of UCIs including CRC bits with priority value of 1, j+1-th PUCCH resource is used.

In the Equations, each of $O_0$ and $O_1$ denotes the bit size of pieces of UCI having different pieces of priority, and includes CRC information corresponding the UCI size. Alternatively, CRC information may be included only for UCI corresponding to a particular priority in either $O_0$ or $O_1$. In this case, the CRC information size may be determined in consideration of the total UCI size of $O_0$ and $O_1$, or in consideration of the UCI size of one of $O_0$ and $O_1$. Each of $r_0$ and $r_1$ is the max code rate value configured in advance via a higher-layer signal, and may have different values according to priority information. A part of Equation 7 may be modified upon Equation 10. For example, $O_{ACK}+O_{SR}+O_{CSI}+O_{CRC}$ in Equation 7 may be modified into $r_1 \cdot (O_{ACK}^0+O_{SR}^0+O_{CSI}^0+O_{CRC}^0)+r^0 \cdot (O_{ACK}^1+O_{SR}^1+O_{CSI}^1+O_{CRC}^1)$ and applied when pieces of UCI having different priorities are included in one PUCCH. In the corresponding equation, $r_x$ denotes the max code rate value, configured via a higher-layer signal, for priority x, $O_{ACK}^x$ denotes the HARQ-ACK information bit size for priority x, $O_{SR}^x$ denotes the SR information bit size for priority x, $O_{CSI}^x$ denotes the CSI information bit size for priority x, and $O_{CRC}^x$ denotes the CRC information bit size for priority x. In addition, this may be also applied to the expressions including $O_{CSI\text{-}part1}$ and $O_{CSI\text{-}part2}$ in Equation 7. The values presented as r in Equation 7 may be replaced with $r_0$ or $r_1$, instead of r, when different pieces of priority information are included in one PUCCH. The modified expressions are applicable when different pieces of UCI are included on PUCCH, and the terminal performs the operation of multiplexing pieces of UCI having different priorities and transmitting the same as described above only when higher-layer signal configuration information to configure, in advance, multiplexing the pieces of UCI having different priorities and transmitting the same is provided in order to support the above-described case. When the higher-layer signal configuration information is not provided, the terminal always multiplexes only the PUCCH including information on the highest priority and transmit the same, and does not transmit UCI having lower priorities.

In another example, in FIG. 9, when two PUCCHs 910 and 912 overlap (this may be understood as overlapping in the time domain, or scheduling in the same slot and/or sub-slot time resource) and pieces of slot length configuration information to determine two PUCCH resources are different from each other, the PUCCH resource selected to multiplex UCI included in the two PUCCHs and transmit the same may vary in the following case. The slot length configuration information may be classified according to whether a slot through which the PUCCH is transmitted or received has a sub-slot length or a slot length, and the sub-slot may have a smaller number of symbols than the slot has. For convenience of description, a PUCCH indicated by the slot-based configuration is referred to as a slot PUCCH 910, and a PUCCH indicated by the sub-slot-based configuration is referred to as a sub-slot PUCCH 912. Further, the slot PUCCH and the sub-slot PUCCH may be indicated by different DCI formats, and may be configured by different pieces of higher-layer signal configuration information. For example, multiple PUCCH resources and a PUCCH resource set for the slot PUCCH may be configured, and multiple PUCCH resources and a PUCCH resource set for the sub-slot PUCCH may be configured, via a higher-layer signal. Accordingly, even though the pieces of PUCCH resource information included in the DCI format are the same, actually, different PUCCH resources may be indicated for the slot PUCCH and the sub-slot PUCCH.

The PUCCH resource is determined as follows. The PUCCH resource set is determined by the UCI size, and a particular PUCCH resource in the determined PUCCH resource set is determined by PUCCH resource indicator (PRI) information existing in the DCI format. The maximum four PUCCH resource sets may be determined via a higher-layer signal, and the thresholds of the UCI size, which determine a PUCCH resource set to be used, may be determined via a higher-layer signal. Table 12 below shows a PUCCH resource indication scheme according to the PRI bit size. When the PRI is 0 bit, the terminal may assume that "1st PUCCH resource provided by pucch-ResourceId obtained from the 1st value of resourceList" is always used, or the PUCCH resource may be determined by a CCE index included in DCI for scheduling the corresponding PUCCH in Equation 11 below.

Equation 11

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format as described in Clause 10.1, $n_{CCE,p}$ is the index of a first CCE for the PDCCH reception, and $\Delta_{PRI}$ is a value of the PUCCH resource indicator field in the DCI format.

When the PRI field does not exist in the DCI in Equation 11 above, that is, when the PRI is 0 bit, it may be assumed in the equation that $R_{PUCCH}$ is 0 or 1, and $\Delta_{PRI}$ is 0 or 1.

TABLE 12

| PUCCH resource indicator | | | PUCCH resource |
|---|---|---|---|
| 1 bit | 2 bits | 3 bits | |
| '0' | '00' | '000' | 1st PUCCH resource provided by pucch-ResourceId obtained from the 1st value of resourceList |
| '1' | '01' | '001' | 2nd PUCCH resource provided by pucch-ResourceId obtained from the 2nd value of resourceList |
| | '10' | '010' | 3rd PUCCH resource provided by pucch-ResourceId obtained from the 3rd value of resourceList |
| | '11' | '011' | 4th PUCCH resource provided by pucch-ResourceId obtained from the 4th value of resourceList |
| | | '100' | 5th PUCCH resource provided by pucch-ResourceId obtained from the 5th value of resourceList |
| | | '101' | 6th PUCCH resource provided by pucch-ResourceId obtained from the 6th value of resourceList |
| | | '110' | 7th PUCCH resource provided by pucch-ResourceId obtained from the 7th value of resourceList |
| | | '111' | 8th PUCCH resource provided by pucch-ResourceId obtained from the 8th value of resourceList |

Hereinafter, a scheme of determining a PUCCH resource in each case is described.

Case 1: The case where both PUCCHs are scheduled by DCI included in the PDCCH.

When two PUCCHs overlap and DCI for scheduling the two PUCCHs are scheduled at different time points, the terminal includes the multiplexed UCI in the PUCCH resource indicated by the PRI of the DCI transmitted or received in the PDCCH having the latest last symbol of the PDCCH transmitting the DCI and transmits the same. According to whether the last-transmitted DCI is the slot PUCCH or the sub-slot PUCCH, a PUCCH resource set(s) is determined, and the PUCCH resource may be determined by the PRI in the determined PUCCH resource set(s).

When there is no PRI, the PUCCH resource may be determined by one of the above-described schemes. For example, in FIG. 9, when the last symbol of the PDCCH including the DCI for scheduling the slot PUCCH 910 comes later than the last symbol of the PDCCH including the DCI for scheduling the sub-slot PUCCH 912, a PUCCH resource set is determined according to the slot PUCCH 910, and the terminal determines a particular PUCCH resource set among the PUCCH resource sets, based on a value used when the pieces of UCI included in the PUCCHs 910 and 912 are multiplexed. Later, the terminal finally determines a PUCCH resource among the determined PUCCH resource set by the PRI for scheduling the slot PUCCH 910.

When the last symbol of the PDCCH included in the DCI for scheduling the slot PUCCH 910 is the same as the last symbol of the PDCCH included in the DCI for scheduling the sub-slot PUCCH 912, the terminal uses PRI information scheduled by the DCI having the highest or lowest CCE index, or uses PRI information of the DCI transmitted or received in the CORESET having the highest or lowest index value, among the CORESETs in which the corresponding DCI is transmitted and received, so as to determine a PUCCH resource.

Alternatively, when the slot PUCCH and the sub-slot PUCCH overlap, the terminal always selects a PUCCH resource set configured based on the slot PUCCH or the sub-slot PUCCH, regardless of the time point at which the DCI is transmitted or received, and may determine a PUCCH resource among the selected PUCCH resource set, based on the PRI included in the latest scheduled DCI.

Case 2: The case in which one PUCCH is scheduled by the DCI included in the PDCCH, and the other PUCCH is activated by a higher-layer signal configuration and/or a L1 signal without providing the PDCCH and is transmitted through a periodical resource.

Case 2 differs from case 1 in that one PUCCH is scheduled without DCI. The PUCCH scheduled without the DCI may always receive configuration of a PUCCH resource in advance via a higher-layer signal, or may be indicated by the PRI included in the DCI for activating the corresponding PUCCH. In this case, for both the PUCCH resource set and the PRI information, the terminal may follow the PUCCH configuration information scheduled by the DCI. Alternatively, when the slot PUCCH 910 and the sub-slot PUCCH 912 overlap as shown in FIG. 9, the PUCCH resource set may follow the PUCCH resource set configuration related to the slot PUCCH or the PUCCH resource set configuration related to the sub-slot PUCCH. In addition, when following the PUCCH resource set determination, the PRI value related to the PUCCH scheduled by the DCI may be always applied. For example, in FIG. 9, when the slot PUCCH 910 is scheduled without DCI, the sub-slot PUCCH 912 is scheduled by the DCI, and the PUCCH resource set is always configured based on the slot PUCCH, the terminal determines one particular PUCCH resource set among multiple PUCCH resource sets configured in advance based on the slot PUCCH, in consideration of the total size of the pieces of UCI at the time of multiplexing, the pieces of UCI being included in the PUCCHs 910 and 912, and the terminal selects one of the multiple PUCCH resources included in the PUCCH resource set through the PRI information included in the DCI which scheduled the sub-slot PUCCH 912.

Case 3: The case in which both PUCCHs are activated by the higher-layer signal configuration and/or an L1 signal without providing the PDCCHs, and are transmitted through the periodical resources.

In case 3, since PUCCH resources are determined for both PUCCHs in advance via a higher-layer signal or an L1 signal without providing the PDCCHs, application of PRI value by using the DCI transmission or reception time point may not be possible. Accordingly, the terminal follows the PUCCH resource set higher-layer signal configuration information associated with the slot PUCCH 910 or the sub-slot PUCCH 912. In addition, the terminal determines one particular PUCCH resource set among the PUCCH resource sets configured via a higher-layer signal, in consideration of the total size of the pieces of UCI at the time of multiplexing, the pieces of UCI being included in the PUCCHs 910 and 912. One PUCCH resource is determined from the PUCCH resource set according to the PRI value of a higher-layer signal indicated at the time of configuration the slot PUCCH 910, or the PRI value of an L1 signal indicated at the time of activating the slot PUCCH 910, or according to the PRI value of a higher-layer signal indicated at the time of configuration the sub-slot PUCCH 912, or the PRI value of an L1 signal indicated at the time of activating the sub-slot PUCCH 912.

Cases 1 to 3 may be applied when the pieces of UCI of the slot PUCCH 910 and the sub-slot PUCCH 912 have the same priority, or may be applied when the pieces of UCI of the slot PUCCH 910 and the sub-slot PUCCH 912 have different priorities but multiplexing has been indicated in advance via a higher-layer. The priorities may be determined by a DCI format for a particular field in the DCI for scheduling the corresponding slot PUCCH 910 or the sub-slot PUCCH 912, or may be determined via a higher-layer signal when the slot PUCCH 910 or the sub-slot PUCCH 912 is scheduled without DCI. Alternatively, when the slot PUCCH 910 and the sub-slot PUCCH 912 include pieces of UCI having different priorities and the base station has not indicated (or configured) multiplexing in advance via a higher-layer signal, the terminal transmits only the PUCCH including the UCI having the higher priority, and drops the PUCCH including the UCI having the lower priority. Alternatively, when the slot PUCCH 910 and the sub-slot PUCCH 912 have the same priority information but multiplexing is not indicated (or configured) according to the higher-layer signal configuration, or the slot PUCCH 910 and the sub-slot PUCCH 912 always operate so as not to be multiplexed to each other, the terminal may always transmit the slot PUCCH 910 and drop the sub-slot PUCCH 912, or vice versa.

Alternatively, when the slot PUCCH 910 and the sub-slot PUCCH 912 have the same priority information but multiplexing is not indicated according to the higher-layer signal configuration, or the slot PUCCH 910 and the sub-slot PUCCH 912 always operate so as not to be multiplexed to each other, the terminal needs to transmit one of the two PUCCH 910 and 912 first than the other, and the operation of the terminal may vary depending on cases 1 to 3. Specifically, in case 1, the terminal first transmits the PUCCH scheduled by the latest transmitted DCI and drops the PUCCH scheduled by the first transmitted DCI. In case 2, the terminal first transmits the PUCCH scheduled by the DCI and drops the PUCCH having no DCI scheduling. In case 3, the terminal always transmits the slot PUCCH 910 and drops the sub-slot PUCCH 912, or vice versa.

The description above is made for the case in which the slot PUCCH 910 and the sub-slot PUCCH 912 at least partially overlap in the time resource. When the slot PUCCHs overlap each other or the sub-slot PUCCHs having the same length of symbols overlap each other, the terminal always performs multiplexing.

Figure 10A:
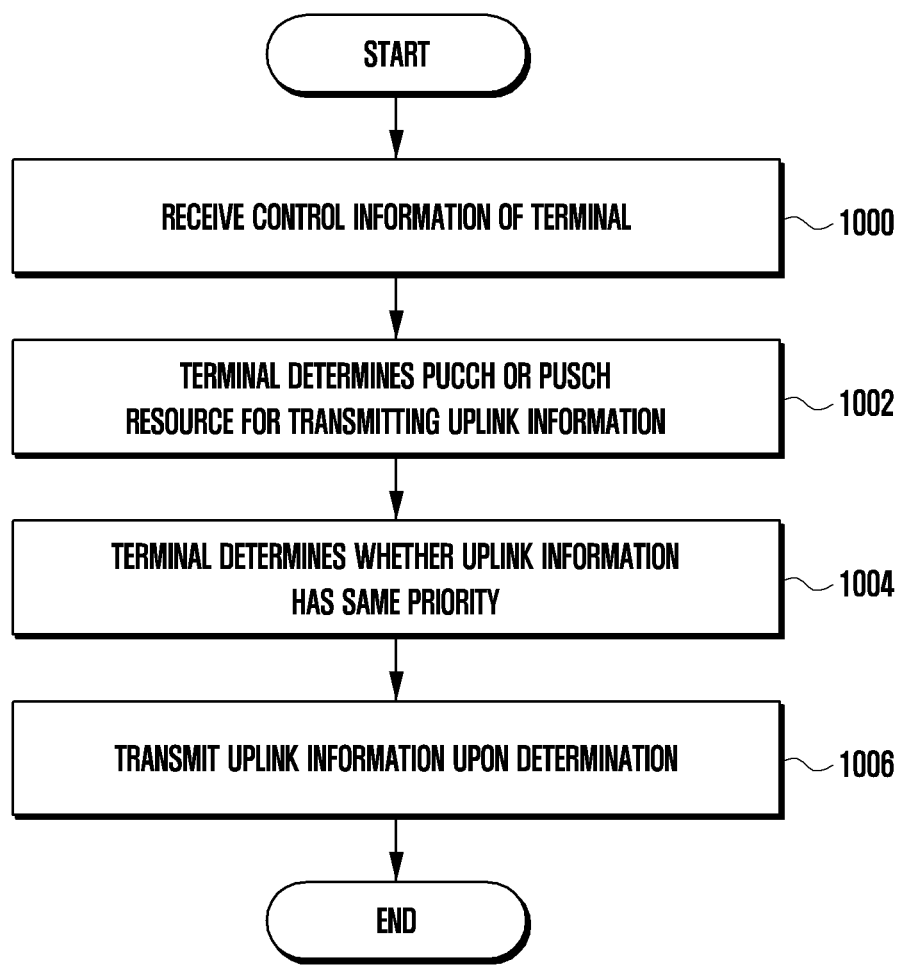
FIG. 10A is a flowchart that illustrates an operation of a terminal according to the examples described in FIGS. 7 to 9 according to an embodiment of the disclosure.

FIG. 10A is a flowchart that illustrates an operation of a terminal according to the examples described in FIGS. 7 to 9 according to an embodiment of the disclosure.

Referring to FIG. 10A, the terminal receives control information indicating transmission or reception of uplink or downlink control information or data information from the base station at operation 1000. The control information may be at least one of DCI for scheduling a PDSCH, DCI for scheduling a PUSCH, or higher-layer signaling for scheduling PUCCH or PUSCH transmission. In this case, the PUCCH or the PUSCH may be scheduled without transmission of DCI corresponding thereto. The terminal determines, through reception of multiple pieces of control information, whether data and/or control information (hereinafter, interchangeably used with uplink information) to be finally transmitted via uplink is to be transmitted on the PUSCH or the PUCCH at operation 1002. The determination scheme may follow the content described in relation to FIGS. 7 to 9. Further, the terminal determines whether pieces of control information or data to be transmitted on the PUCCH or the PUSCH correspond to the same priority value or different priority values at operation 1004. Upon the determination above, the terminal transmits uplink control information and/or data to the base station at operation 1006. The uplink control information and/or data transmitted by the terminal and a PUCCH transmission resource or a PUSCH transmission resource used to transmit the uplink control information and/or data by the terminal may follow the content described in relation to FIGS. 7 to 9. The sequence of the above-described operations may be changed or omitted.

Figure 10B:
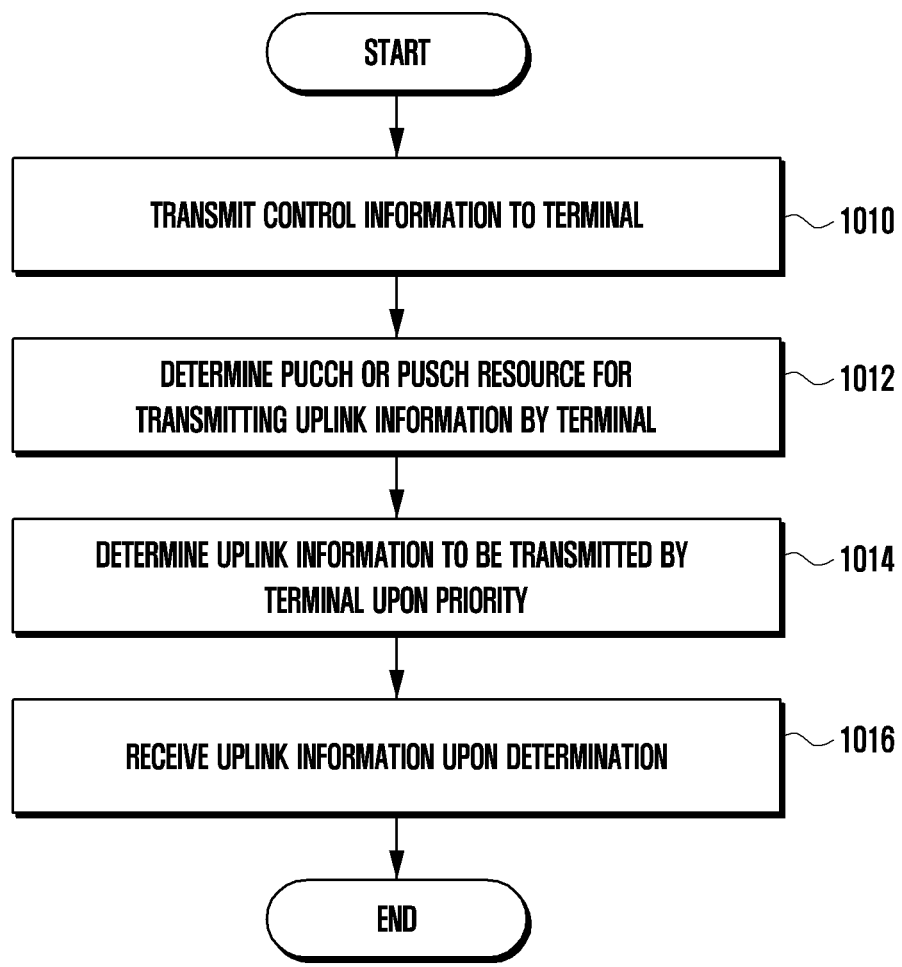
FIG. 10B is a flowchart that illustrates an operation of a base station according to the examples described in FIGS. 7 to 9 according to an embodiment of the disclosure.

FIG. 10B is a flowchart that illustrates an operation of a base station according to the examples described in FIGS. 7 to 9 according to an embodiment of the disclosure.

Referring to FIG. 10B, the base station transmits control information indicating transmission or reception of uplink or downlink control information or data information to the terminal at operation 1010. The control information may be at least one of DCI for scheduling a PDSCH, DCI for scheduling a PUSCH, or higher-layer signaling for scheduling PUCCH or PUSCH transmission. In this case, the PUCCH or the PUSCH may be scheduled without transmission of DCI corresponding thereto. The base station determines, according to the transmitted multiple pieces of control information, whether pieces of data and/or control information to be finally transmitted via uplink are to be received on the PUSCH or the PUCCH at operation 1012. The determination scheme may follow the content described in relation to FIGS. 7 to 9. Further, the base station determines whether pieces of control information or data to be transmitted on the PUCCH or the PUSCH correspond to the same priority value or different priority values, and determines, according to the content described in relation to FIGS. 7 to 9, the control information and/or data to be received at operation 1014. Upon the determination above, the base station receives uplink control information and/or data from the terminal at operation 1016. The uplink control information and/or data transmitted by the terminal and a PUCCH transmission resource or a PUSCH transmission resource used to transmit the uplink control information and/or data by the terminal may follow the content described in relation to FIGS. 7 to 9. The sequence of the above-described operations may be changed or omitted.

Figure 11:
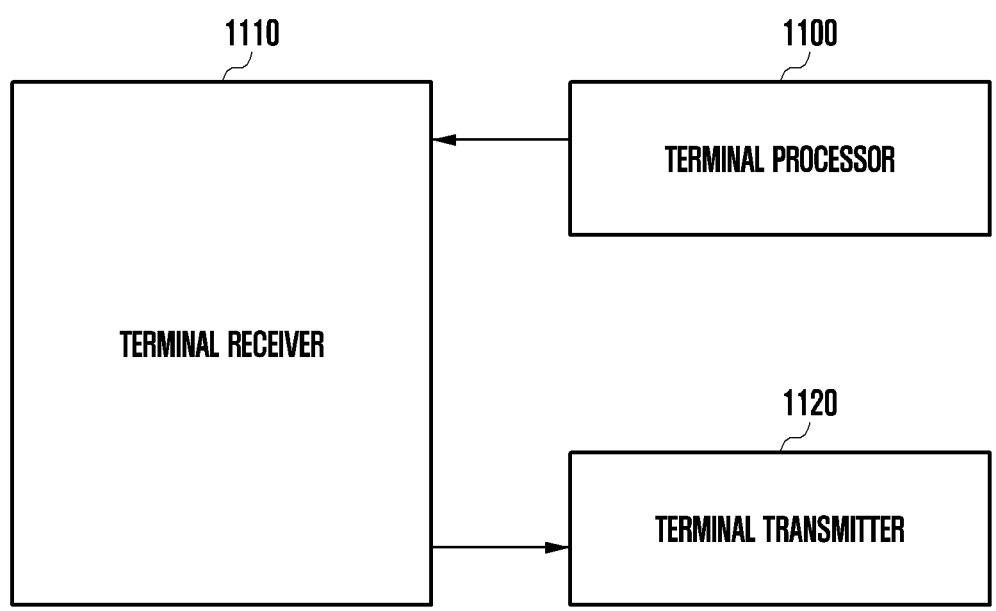
FIG. 11 a block diagram illustrating a structure of a terminal according to an embodiment of the disclosure.

FIG. 11 is a block diagram illustrating a structure of a terminal according to an embodiment of the disclosure.

Referring to FIG. 11, the terminal of the disclosure may include a terminal receiver 1110, a terminal transmitter 1120, and at least one terminal processor 1100. The terminal receiver 1110 and the terminal transmitter 1120 may be collectively referred to as a "transceiver" in an embodiment. The transceiver may transmit or receive a signal to or from a base station. The signal may include control information and data. To this end, the transceiver may include an RF transmitter that up-converts and amplifies the frequency of a transmitted signal, an RF receiver that low-noise amplifies a received signal and down-converts the frequency thereof, and the like. In addition, the transceiver may output, to the terminal processor 1100, a signal received via a radio channel, and transmit a signal output from the terminal processor 1100 via the radio channel. The terminal processor 1100 may control a series of processes so that the terminal operates according to the above-described embodiments.

Figure 12:
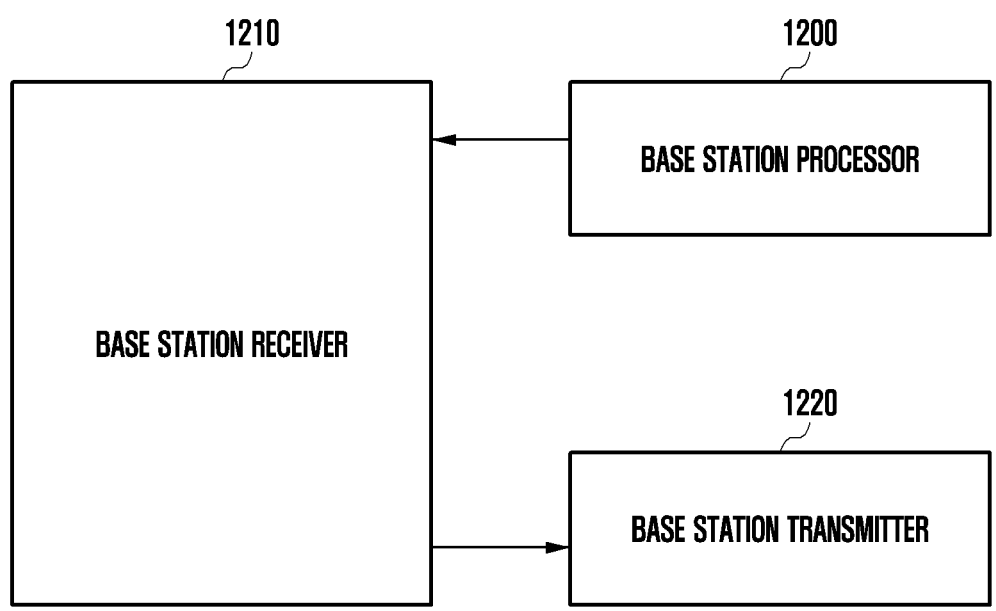
FIG. 12 is a block diagram illustrating a structure of a base station according to an embodiment of the disclosure.

FIG. 12 is a block diagram illustrating a structure of a base station according to an embodiment of the disclosure.

Referring to FIG. 12, the base station of the disclosure may include at least one of a base station receiver 1210, a base station transmitter 1220, and at least one base station processor 1200. The base station receiver 1210 and the base station transmitter 1220 may be collectively referred to as a "transceiver" in an embodiment of the disclosure. The transceiver may transmit or receive a signal to or from a terminal. The signal may include control information and data. To this end, the transceiver may include an RF transmitter that up-converts and amplifies the frequency of a transmitted signal, an RF receiver that low-noise amplifies a received signal and down-converts the frequency thereof, and the like. In addition, the transceiver may output, to the base station processor 1200, a signal received via a radio channel, and transmit a signal output from the base station processor 1200 via the radio channel. The base station processor 1200 may control a series of processes so that the base station operates according to the above-described embodiments of the disclosure.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, embodiments 1, 2, and 3 of the disclosure may be partially combined to operate a base station and a terminal. Further, although the above embodiments have been described by way of the NR system, other variants based on the technical idea of the embodiments may be implemented in other systems such as FDD or TDD LTE systems.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a terminal in a communication system, the method comprising:
   receiving, from a base station, configuration information on a physical uplink control channel (PUCCH), the configuration information including a sub-slot configuration for the PUCCH;
   receiving, from the base station, downlink control information (DCI) for scheduling downlink data, the DCI including a feedback timing indicator and a PUCCH resource indicator (PRI);
   receiving, from the base station, the downlink data on a physical downlink shared channel (PDSCH) based on the DCI;

identifying a sub-slot for the PUCCH and a PUCCH resource based on the sub-slot configuration for the PUCCH, the feedback timing indicator, and the PRI; and transmitting, to the base station, HARQ-ACK information for the downlink data on the identified PUCCH resource in the sub-slot for the PUCCH, wherein the sub-slot configuration for the PUCCH includes information on a length of the sub-slot for the PUCCH, wherein the information on the length of the sub-slot for the PUCCH indicates one of 2 or 7 symbols in case that a normal cyclic prefix is applied, and wherein the information on the length of the sub-slot for the PUCCH indicates one of 2 or 6 symbols in case that an extended cyclic prefix is applied.

2. The method of claim 1, wherein the sub-slot for the PUCCH is identified based on a number of sub-slots indicated by the feedback timing indicator.

3. The method of claim 1, wherein the PRI indicates the PUCCH resource in the sub-slot for the PUCCH indicated by the feedback timing indicator.

4. The method of claim 1, wherein a starting symbol index for the PUCCH associated with the PRI is identified based on a first orthogonal frequency-division multiplexing (OFDM) symbol of the sub-slot for the PUCCH.

5. A method performed by a base station in a communication system, the method comprising:

transmitting, to a terminal, configuration information on a physical uplink control channel (PUCCH), the configuration information including a sub-slot configuration for the PUCCH;

transmitting, to the terminal, downlink control information (DCI) for scheduling downlink data, the DCI including a feedback timing indicator and a PUCCH resource indicator (PRI);

transmitting, to the terminal, the downlink data on a physical downlink shared channel (PDSCH); and receiving, from the terminal, HARQ-ACK information corresponding to the downlink data on a PUCCH resource in a sub-slot for the PUCCH, wherein the sub-slot for the PUCCH and the PUCCH resource depend on the sub-slot configuration for the PUCCH, the feedback timing indicator, and the PRI, wherein the sub-slot configuration for the PUCCH includes information on a length of the sub-slot for the PUCCH, wherein the information on the length of the sub-slot for the PUCCH indicates one of 2 or 7 symbols in case that a normal cyclic prefix is applied, and wherein the information on the length of the sub-slot for the PUCCH indicates one of 2 or 6 symbols in case that an extended cyclic prefix is applied.

6. The method of claim 5, wherein the sub-slot for the PUCCH corresponds to a number of sub-slots indicated by the feedback timing indicator.

7. The method of claim 5, wherein the PRI indicates the PUCCH resource in the sub-slot for the PUCCH indicated by the feedback timing indicator.

8. The method of claim 5, wherein a starting symbol index for the PUCCH associated with the PRI is based on a first orthogonal frequency-division multiplexing (OFDM) symbol of the sub-slot for the PUCCH.

9. A terminal in a communication system, the terminal comprising:

a transceiver; and a controller coupled with the transceiver and configured to:

receive, from a base station, configuration information on a physical uplink control channel (PUCCH), the configuration information including a sub-slot configuration for the PUCCH, receive, from the base station, downlink control information (DCI) for scheduling downlink data, the DCI including a feedback timing indicator and a PUCCH resource indicator (PRI), receive, from the base station, the downlink data on a physical downlink shared channel (PDSCH) based on the DCI, identify a sub-slot for the PUCCH and a PUCCH resource based on the sub-slot configuration for the PUCCH, the feedback timing indicator, and the PRI, and transmit, to the base station, HARQ-ACK information for the downlink data on the identified PUCCH resource in the sub-slot for the PUCCH, wherein the sub-slot configuration for the PUCCH includes information on a length of the sub-slot for the PUCCH, wherein the information on the length of the sub-slot for the PUCCH indicates one of 2 or 7 symbols in case that a normal cyclic prefix is applied, and wherein the information on the length of the sub-slot for the PUCCH indicates one of 2 or 6 symbols in case that an extended cyclic prefix is applied.

10. The terminal of claim 9, wherein the sub-slot for the PUCCH is identified based on a number of sub-slots indicated by the feedback timing indicator.

11. The terminal of claim 9, wherein the PRI indicates the PUCCH resource in the sub-slot for the PUCCH indicated by the feedback timing indicator.

12. The terminal of claim 9, wherein a starting symbol index for the PUCCH associated with the PRI is identified based on a first orthogonal frequency-division multiplexing (OFDM) symbol of the sub-slot for the PUCCH.

13. A base station in a communication system, the base station comprising:

a transceiver; and a controller coupled with the transceiver and configured to:

transmit, to a terminal, configuration information on a physical uplink control channel (PUCCH), the configuration information including a sub-slot configuration for the PUCCH, transmit, to the terminal, downlink control information (DCI) for scheduling downlink data, the DCI including a feedback timing indicator and a PUCCH resource indicator (PRI), transmit, to the terminal, the downlink data on a physical downlink shared channel (PDSCH), and receive, from the terminal, HARQ-ACK information corresponding to the downlink data on a PUCCH resource in a sub-slot for the PUCCH, wherein the sub-slot for the PUCCH and the PUCCH resource depend on the sub-slot configuration for the PUCCH, the feedback timing indicator, and the PRI, wherein the sub-slot configuration for the PUCCH includes information on a length of the sub-slot for the PUCCH, wherein the information on the length of the sub-slot for the PUCCH indicates one of 2 or 7 symbols in case that a normal cyclic prefix is applied, and wherein the information on the length of the sub-slot for the PUCCH indicates one of 2 or 6 symbols in case that an extended cyclic prefix is applied.

14. The base station of claim 13, wherein the sub-slot for the PUCCH corresponds to a number of sub-slots indicated by the feedback timing indicator.

15. The base station of claim 13, wherein the PRI indicates the PUCCH resource in the sub-slot for the PUCCH indicated by the feedback timing indicator.

16. The base station of claim 13, wherein a starting symbol index for the PUCCH associated with the PRI is based on a first orthogonal frequency-division multiplexing (OFDM) symbol of the sub-slot for the PUCCH.

* * * * *